(12) United States Patent
Kim et al.

(10) Patent No.: US 10,797,745 B2
(45) Date of Patent: Oct. 6, 2020

(54) METHOD FOR IN-BAND FULL-DUPLEX TRANSMISSION AND RECEPTION, AND APPARATUS FOR THE SAME

(71) Applicant: Electronics and Telecommunications Research Institute, Daejeon (KR)

(72) Inventors: Seon Ae Kim, Daejeon (KR); Dong Hyuk Gwak, Daejeon (KR); Tae Joong Kim, Daejeon (KR); Jung Bo Son, Daejeon (KR); Yu Ro Lee, Daejeon (KR); Hyun Lee, Daejeon (KR); Hyung Sik Ju, Hwaseong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/221,970

(22) Filed: Dec. 17, 2018

(65) Prior Publication Data
US 2019/0199392 A1    Jun. 27, 2019

(30) Foreign Application Priority Data

Dec. 21, 2017  (KR) .................. 10-2017-0177056

(51) Int. Cl.
*H04B 1/525*    (2015.01)
*H04B 1/00*    (2006.01)
(Continued)

(52) U.S. Cl.
CPC ........... *H04B 1/525* (2013.01); *H04B 1/0042* (2013.01); *H04L 5/14* (2013.01); *H04L 25/0204* (2013.01); *H04B 2001/485* (2013.01)

(58) Field of Classification Search
CPC ................. H04B 1/525; H04B 1/0042; H04B 2001/485; H04L 25/0204; H04L 5/14
See application file for complete search history.

(56) References Cited

U.S. PATENT DOCUMENTS 6,487,252 B1 * 11/2002 Kleider ................ H04L 5/0048
                                                      370/320
9,001,867 B2    4/2015 Wang et al.
(Continued)

FOREIGN PATENT DOCUMENTS

| EP | 3057248 A1 | 8/2016 |
|---|---|---|
| EP | 2938148 B1 | 9/2017 |
| WO | WO-2015-160009 A1 | 10/2015 |

*Primary Examiner* — Jean B Corrielus
(74) *Attorney, Agent, or Firm* — Rabin & Berdo, P.C.

(57) ABSTRACT

An operation method of an in-band full duplex (IFD) transceiving apparatus including a receiving end, a transmitting end, a digital self-interference cancellation (DSIC) processing unit, and a digital SI cancellation unit may comprise generating, by the DSIC processing unit, signal shaping coefficients for wave shaping of a signal of the transmitting end; generating, by the DSIC processing unit, channel estimation coefficients for cancellation of a self-interference signal in a reception signal of the receiving end; forming, by the DSIC processing unit, a transmission signal based on the signal shaping coefficients; and generating, by the DSIC processing unit, a control signal for cancellation of the self-interference signal in the reception signal based on the channel estimation coefficients.

8 Claims, 14 Drawing Sheets

(51) Int. Cl.
  *H04L 25/02* (2006.01)
  *H04L 5/14* (2006.01)
  *H04B 1/48* (2006.01)

(56) References Cited

U.S. PATENT DOCUMENTS

| | | |
|---|---|---|
| 9,313,012 B2 | 4/2016 | Celebi et al. |
| 2006/0023798 A1* | 2/2006 | Paek ................. H04L 25/03019 375/260 |
| 2006/0114976 A1* | 6/2006 | Langberg ................. H04B 3/23 375/222 |
| 2006/0215747 A1* | 9/2006 | Pietraski ............ H03H 21/0043 375/232 |
| 2007/0036236 A1* | 2/2007 | Wu ...................... H04B 7/0891 375/267 |
| 2010/0046600 A1* | 2/2010 | Zerbe ................. H04L 25/0307 375/233 |
| 2013/0114468 A1* | 5/2013 | Hui ..................... H01Q 3/2611 370/277 |
| 2013/0223550 A1* | 8/2013 | Fimoff ................. H04L 1/0045 375/261 |
| 2014/0211883 A1* | 7/2014 | Chai .................... H04L 1/0034 375/296 |
| 2014/0348018 A1* | 11/2014 | Bharadia ............... H04L 5/1461 370/252 |
| 2016/0218769 A1 | 7/2016 | Chang et al. |
| 2016/0294532 A1* | 10/2016 | Masmoudi ........... H04B 15/005 |
| 2016/0329982 A1 | 11/2016 | Lim et al. |
| 2017/0048741 A1 | 2/2017 | Lee et al. |
| 2017/0223709 A1 | 8/2017 | Noh |
| 2019/0081770 A1* | 3/2019 | Zhao ................. H04L 25/03834 |
| 2019/0245566 A1* | 8/2019 | Luo ...................... H04B 1/0475 |

* cited by examiner

100

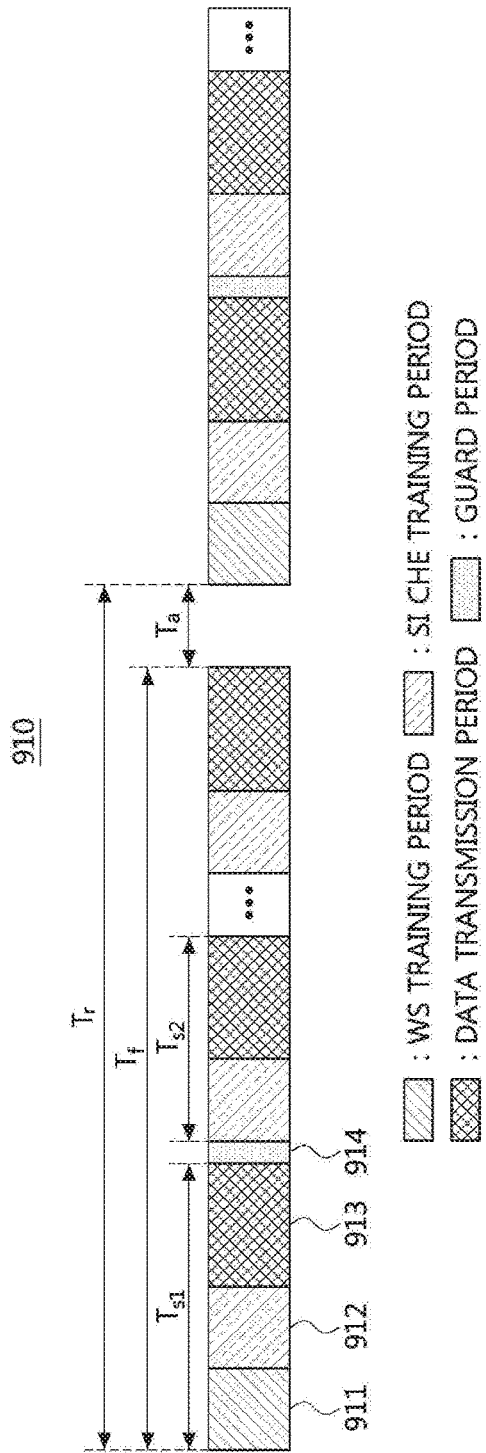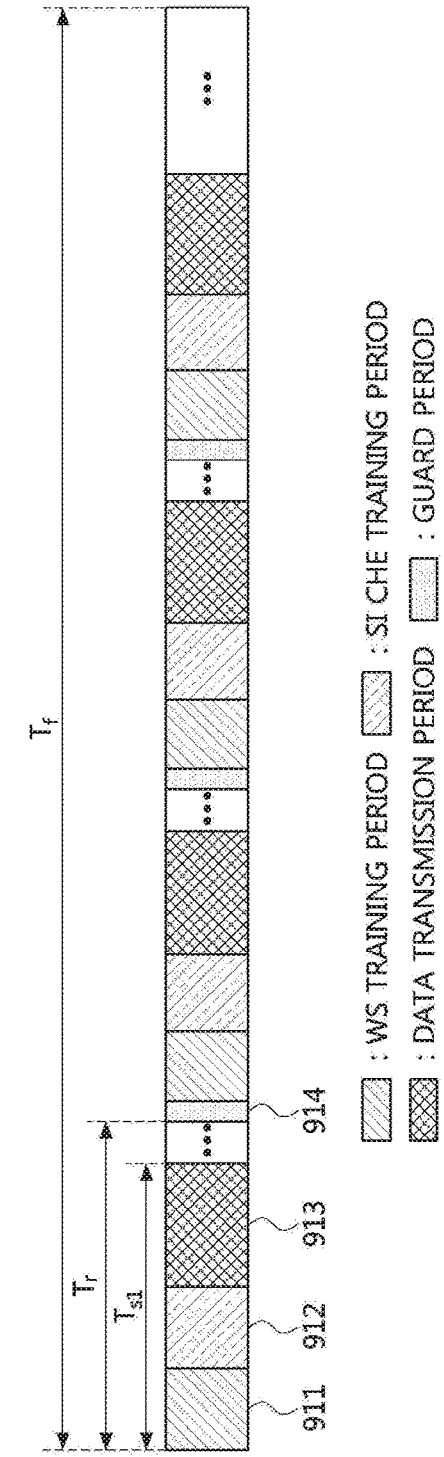

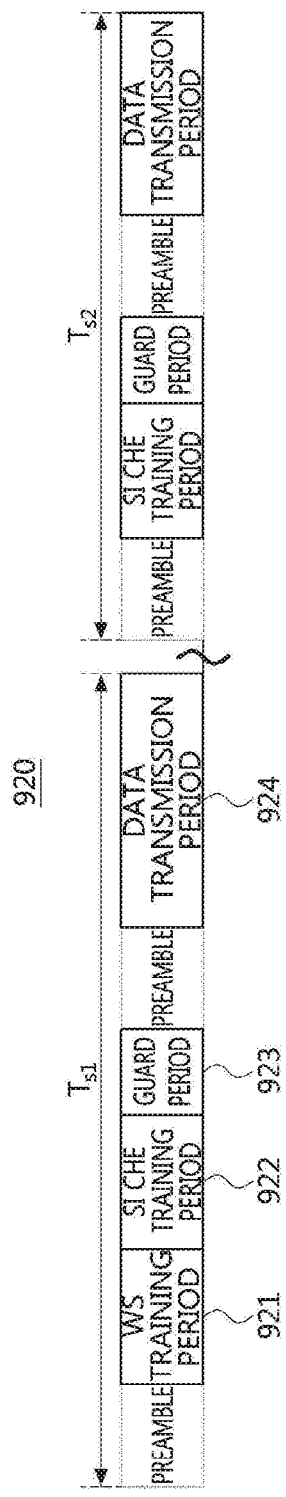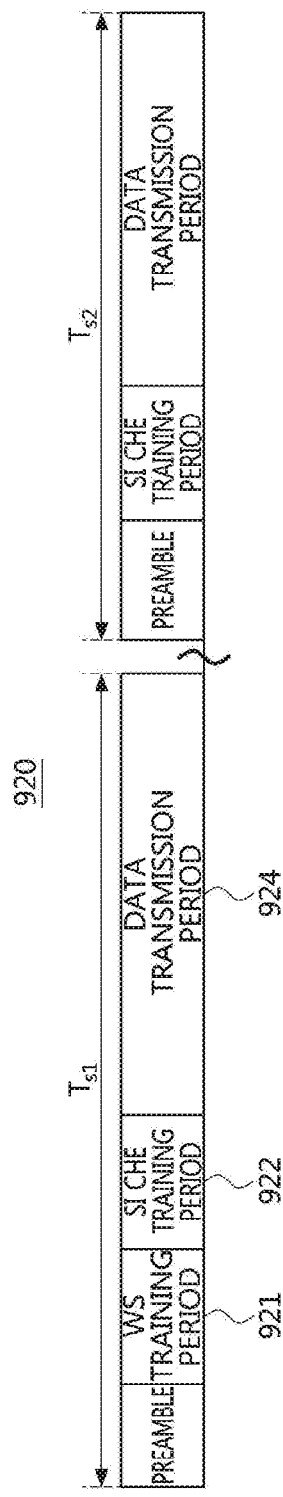

DwPTS : DOWNLINK PILOT TIME SLOT
UpPTS : UPLINK PILOT TIME SLOT

METHOD FOR IN-BAND FULL-DUPLEX TRANSMISSION AND RECEPTION, AND APPARATUS FOR THE SAME

CROSS-REFERENCE TO RELATED APPLICATIONS

This application claims priority to Korean Patent Application No. 10-2017-0177056 filed on Dec. 21, 2017 in the Korean Intellectual Property Office (KIPO), the entire contents of which are hereby incorporated by reference.

BACKGROUND

1. Technical Field

The present disclosure relates to a method and an apparatus for in-band full-duplex (IFD) transmission and reception, more specifically, to a method and an apparatus for IFD transmission and reception, which are able to cancel non-linear self-interference (SI) signals as well as linear SI signals, and reduce complexity and hardware cost in digital SI cancellation.

2. Related Art

The in-band full duplex (IFD) is a technique for simultaneously transmitting and receiving signals in the same band. It is a technology that can theoretically increase a link capacity up to twice as much as a general half-duplex (HD) scheme. However, the IFD scheme has a problem in that a transmission signal is introduced into a receiver, and a strong self-interference (SI) signal is generated, which is stronger than a desired reception signal. Therefore, the signal should be cancelled in order to realize smooth communications by such the IFD scheme. However, in general, the conventional SIC technique has a problem in that the complexity of the transceiver increases.

In order to realize the IFD communications, the receiver should receive a desired signal (DS) and at the same time cancel the SI signal in real time. When the SI signal is a simple linear signal, the digital receiver may be configured to simply damp a received SI signal to a transmitted SI signal level to cancel out the two signals. However, since the SI signal is fundamentally a modulated signal for RF communications, its signal characteristics may be distorted by analog RF components and the distorted SI signal may be introduced into the receiver.

In particular, a non-linear SI, which occurs as having a size of several tens dB less than a transmission power according to the magnitude of the transmission power and the characteristics of the analog RF components, may become a main factor causing degradation of a communication quality by acting as interfering noises on the desired signal when it is not canceled through an additional signal processing. Accordingly, since the IFD transceiver requires a real-time SIC technique for cancelling not only the linear SI signals but also the non-linear SI signals, the complexity and the hardware cost for the digital SIC may greatly increase.

SUMMARY

Accordingly, embodiments of the present disclose provide a method and an apparatus for IFD transmission and reception, which are able to cancel non-linear self-interference (SI) signals as well as linear SI signals, and reduce complexity and hardware cost in digital SI cancellation.

In order to achieve the objective of the present disclosure, an operation method of an in-band full duplex (IFD) transceiving apparatus including a receiving end, a transmitting end, a digital self-interference cancellation (DSIC) processing unit, and a digital SI cancellation unit may comprise generating, by the DSIC processing unit, signal shaping coefficients for wave shaping of a signal of the transmitting end; generating, by the DSIC processing unit, channel estimation coefficients for cancellation of a self-interference signal in a reception signal of the receiving end; forming, by the DSIC processing unit, a transmission signal based on the signal shaping coefficients; and generating, by the DSIC processing unit, a control signal for cancellation of the self-interference signal in the reception signal based on the channel estimation coefficients.

The DSIC processing unit may generate the control signal in a downsampling time domain.

In the generating of the control signal, the DSIC processing unit may generate the control signal based on a first signal received from the transmitting end and a second signal obtained by downsampling an output signal of an analog-to-digital converter (ADC) disposed in the receiving end.

The operation method may further comprise outputting, by the DSIC processing unit, the control signal to the digital SI cancellation unit; and generating, by the digital SI cancellation unit, a desired signal by cancelling the self-interference signal from the reception signal based on the control signal.

The operation method may further comprise outputting, by the digital SI cancellation unit, the desired signal to a signal recovery unit disposed in the receiving end.

The DSIC processing unit may generate the control signal in an oversampling time domain.

In the generating of the control signal, the DSIC processing unit may generate the control signal based on a first signal obtained by oversampling a signal input from the transmitting end and a second signal output from an analog-to-digital converter (ADC) disposed in the receiving end, and the DSIC processing unit may generate a basis matrix based on the signal obtained by analog-to-digital converting the signal of the transmitting end.

The DSIC processing unit may generate the signal shaping coefficients based on the basis matrix so that the first signal becomes identical to the transmission signal.

The operation method may further comprise outputting, by the DSIC processing unit, the formed transmitting signal to a digital-to-analog converter (DAC) disposed in the transmitting end.

In order to achieve the objective of the present disclosure, an in-band full duplex (IFD) transceiving apparatus may comprise a memory storing at least one program instruction, a processor executing the at least one program instruction, a transceiver performing communications as connected in a network, and a digital-to-analog converter (DAC) which is located in a transmitting end of the transceiver and converts a transmission signal to an analog signal. Also, the at least one instruction may be configured to generate signal shaping coefficients for wave shaping of a signal of the transmitting end; generate channel estimation coefficients for cancellation of a self-interference signal in a reception signal of a receiving end of the transceiving apparatus; form a transmission signal based on the signal shaping coefficients; and generate a control signal for cancellation of the self-interference signal in the reception signal based on the channel estimation coefficients.

The at least one instruction may be configured to generate the control signal in a downsampling time domain.

The at least one instruction may be configured to generate the control signal based on a first signal received from the transmitting end and a second signal obtained by downsampling an output signal of an analog-to-digital converter (ADC) disposed in the receiving end.

The at least one instruction may be configured to generate a desired signal by cancelling the self-interference signal from the reception signal based on the control signal.

The at least one instruction may be configured to output the desired signal to a signal recovery unit disposed in the receiving end.

The at least one instruction may be configured to generate the control signal in an oversampling time domain.

The at least one instruction may be configured to generate the control signal based on a first signal obtained by oversampling a signal input from the transmitting end and a second signal output from an analog-to-digital converter (ADC) disposed in the receiving end.

The at least one instruction may be configured to, when the signal shaping coefficients are generated, generate a basis matrix based on a signal obtained by analog-to-digital converting the signal of the transmitting end, and generate the signal shaping coefficients based on the basis matrix so that the first signal becomes identical to the transmission signal.

The at least one instruction may be configured to output the formed transmitting signal to a digital-to-analog converter (DAC) disposed in the transmitting end.

According to the IFD transceiving methods and apparatuses of the present disclosure, non-linear SI signals as well as linear SI signals can be canceled. Also, the IFD transceiving methods and apparatuses of the present disclosure can reduce complexity and hardware cost in the digital SI cancellation.

BRIEF DESCRIPTION OF DRAWINGS

Embodiments of the present disclosure will become more apparent by describing in detail embodiments of the present disclosure with reference to the accompanying drawings, in which:

FIGS. 6A and 6B are diagrams illustrating an IFD frame structure according to an embodiment of the present disclosure, which illustrate training periods and data transmission periods;

FIGS. 7A and 7B are diagrams for a method of arranging training periods in a WLAN PHY frame;

DETAILED DESCRIPTION

Figure 1:
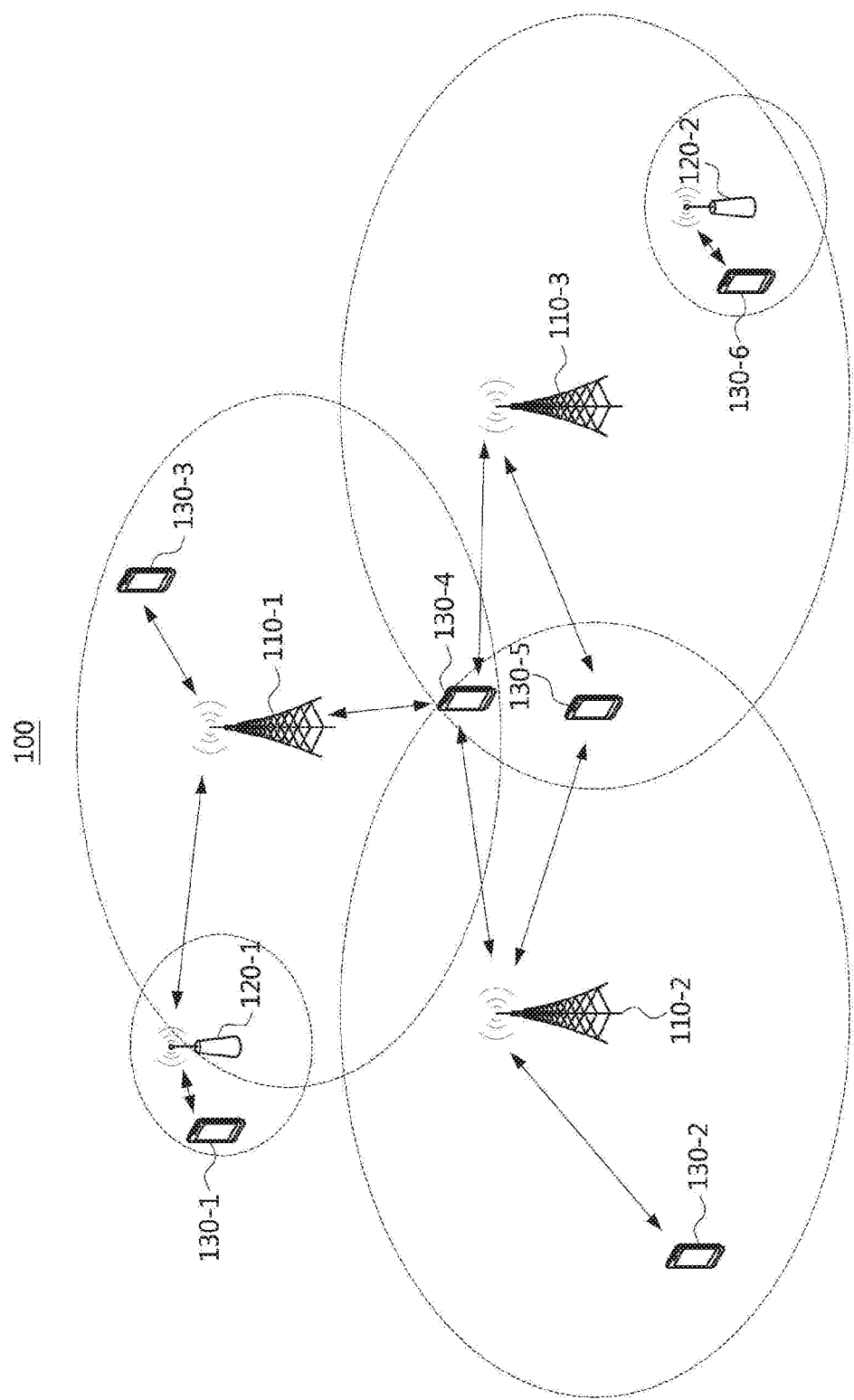
FIG. 1 is a conceptual diagram illustrating a mobile communication system according to a first embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system 100 may also be referred to as a 'communication network'. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a cyclic prefix OFDM (CP-OFDM) based communication protocol, a discrete Fourier transform spread OFDM (DFT-s-OFDM) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, and a space division multiple access (SDMA) based communication protocol. Each of the plurality of communication nodes may have the following structure.

Figure 2:
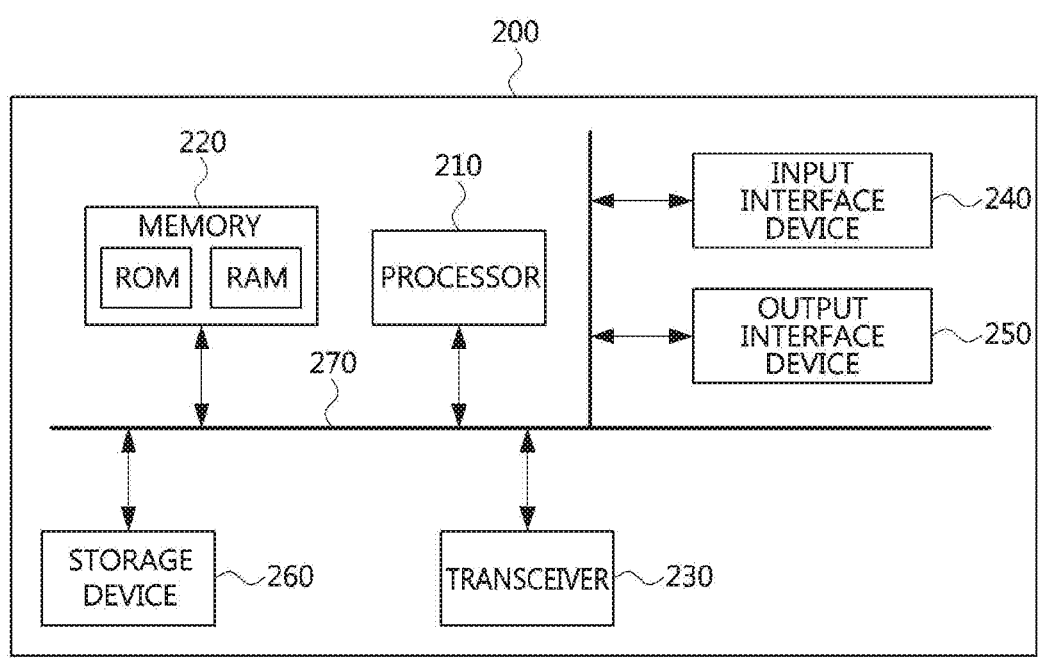
FIG. 2 is a block diagram illustrating a communication node in a mobile communication system according to a first embodiment of the present disclosure.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260 (or digital signal processor (DSP)), and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 (or DSP) via a dedicated interface.

The processor 210 may execute a program stored in at least one of the memory 220 and the storage device 260 (or DSP). The processor 210 may refer to a central processing unit (CPU), a graphics processing unit (GPU), or a dedicated processor on which methods in accordance with embodiments of the present disclosure are performed. Each of the memory 220 and the storage device 260 (or DSP) may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-eNB, a base transceiver station (BTS), a radio base station, a radio transceiver, an access point, an access node, a road side unit (RSU), a radio remote head (RRH), a transmission point (TP), a transmission and reception point (TRP), a flexible TRP (f-TRP), or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, a device supporting internet of things (IoT) functions, a mounted module/device/terminal, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3:
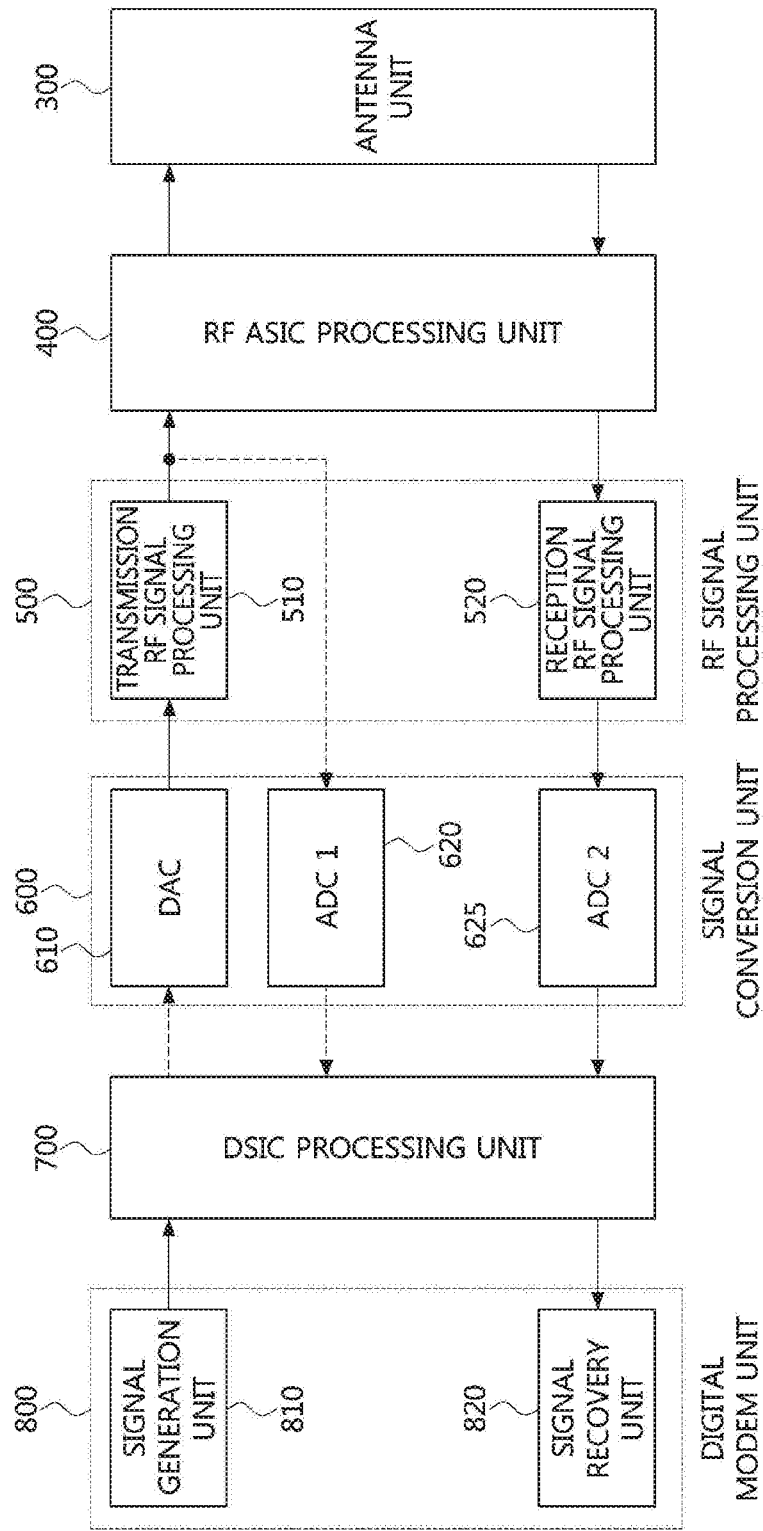
FIG. 3 is a block diagram illustrating an IFD transceiver according to an embodiment of the present disclosure.

FIG. 3 is a block diagram illustrating an IFD transceiver according to an embodiment of the present disclosure.

Referring to FIG. 3, an IFD transceiver according to an embodiment of the present disclosure may comprise an antenna unit 300, an RF analog self-interference cancellation (ASIC) processing unit 400, an RF signal processing unit 500, a signal conversion unit 600, a digital SIC (DSIC) processing unit 700, and a digital modem unit 800.

The antenna unit 300 may comprise one or a plurality of antennas, and each antenna may be connected to the RF ASIC processing unit 400. Here, the antenna of the antenna unit 300 may be a distributed antenna. Also, a shared antenna may be used as the antenna of the antenna unit 300. The antenna unit 300 may include a signal distributor such as a circulator for signal separation between a receiving end and a transmitting end.

For example, a transmission and reception shared antenna may have a structure in which a transmission path and a reception path are connected to a single antenna through a signal distributor. Alternatively, in case of a separate antenna structure, a transmission antenna may be connected to a transmission path and a reception antenna may be connected to a reception path. Also, the antenna may be an omnidirectional antenna type that emits or receives a signal in all directions, a sector antenna or a beamforming antenna type that emits or receives a signal in a specific angle range (e.g., a sector or a beam), or the like.

The RF ASIC processing unit 400 may cancel SI signals in an analog domain of an RF band, and may transmit the SI-canceled signal to the RF signal processing unit 500. The RF ASIC processing unit 400 may include an analog finite impulse response (FIR) filter, and the analog FIR filter may include a plurality of attenuators and a plurality of phase shifters coupled to the respective attenuators. As another example, the RF ASIC processing unit 400 may include a reverse phase generating device, such as a Balun filter.

The RF ASIC processing unit 400 may determine control values for the attenuators and the phase shifters of the analog FIR filter through input and output signals of the analog FIR filter which are converted into digital domain signals. The RF ASIC processing unit 400 may execute a digital control algorithm that controls the RF analog FIR filter, and the control values of the attenuators and the phase shifters of the analog FIR filter determined by the digital control algorithm may be generated as digital control information.

The RF signal processing unit 500 may include a transmission RF signal processing unit 510 and a reception RF signal processing unit 520. Each of the transmission RF signal processing unit 510 and the reception RF signal processing unit 520 may include a frequency converter and a signal amplifier. The frequency converter may convert a baseband signal into an RF band signal, and conversely convert an RF band signal into a baseband signal. Specifically, the frequency converter may include an up/down converter configured with a local oscillator (LO) and a mixer/integrator. The signal amplifier may amplify an input signal and output the amplified input signal, and may include a high power amplifier (HPA), a low noise amplifier (LNA), and a variable gain amplifier (VGA). The HPA may amplify a transmissions signal converted into an RF signal, and output the amplified transmission signal. The LNA may amplify a reception signal while maintaining a low noise level and output the amplified reception signal. The VGA may variably adjust a gain of an input signal, and may adjust a size of a reception signal in order to convert a received SI signal or a desired signal (DS) into a digital signal of a predetermined size. Here, the LNA may be selectively applied according to the size of a signal input to the RF signal processing unit 500 after passing through the RF ASIC processing unit 400.

The signal conversion unit 600 may include a digital-to-analog converter (DAC) 610 for converting a digital signal into an analog signal, and a first analog-to-digital converter (ADC) 620 and a second ADC 625 for converting an analog signal into a digital signal. The DAC 610 may convert the digital signal input from the DSIC processing unit 700 into an analog signal, and transmit the converted analog signal to the transmission RF signal processing unit 510. Also, the first ADC 620 may convert an analog signal output from the transmission RF signal processing out 510 into a digital signal, and transmit the converted digital signal to the DSIC processing unit 700. Also, the second ADC 625 may convert an analog signal output from the reception RF signal processing out 520 into a digital signal, and transmit the converted digital signal to the DSIC processing unit 700.

When an SI signal is sequentially inputted to the digital domain through a radio section (i.e., air), the reception RF signal processing unit 520, and the second ADC 625, the DSIC processing unit 700 may perform digital signal processing to cancel the SI signal. The DSIC processing unit 700 may be disposed over the entire transmission and reception digital domain between the digital modem unit 800 and the signal conversion unit 600. The DSIC processing unit 700 may form a transmission signal to control or remove components constituting the SI signal by element, and may reproduce and cancel the received SI signal.

The digital modem unit 800 may comprise a signal generation unit 810 and a signal recovery unit 820. The signal generation unit 810 may generate a training symbol for cancellation of the SI signal, and a data frame in which actual data is modulated (specifically, a time-domain transmission signal). The signal generation unit 810 may transmit the generated training symbols and the data frames to the DSIC processing unit 700. The signal recovery unit 820 may receive an SI-canceled desired signal (DS) from the DSIC processing unit 700, and demodulate the received DS according to a frame format.

Figure 4:
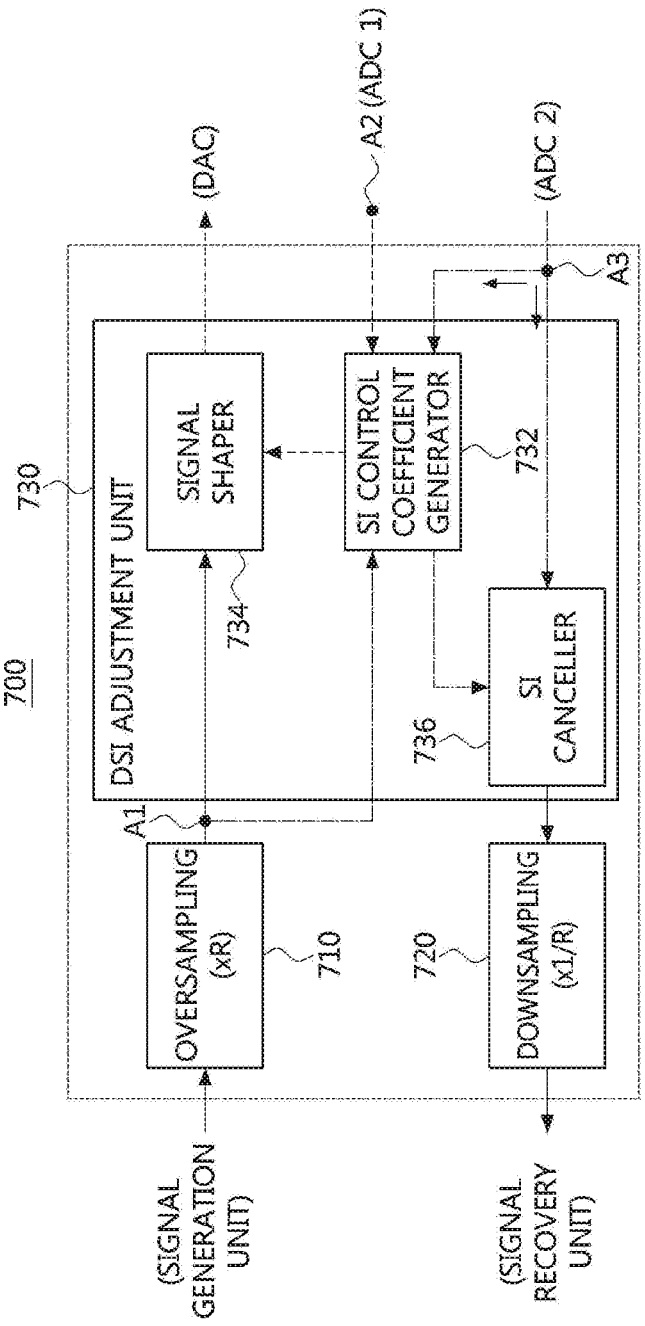
FIG. 4 is a block diagram illustrating a DSIC processing unit according to a first embodiment of the present disclosure.

FIG. 4 is a block diagram illustrating a DSIC processing unit according to a first embodiment of the present disclosure.

Referring to FIG. 4, the DSIC processing unit 700 according to a first embodiment of the present disclosure may comprise an oversampling unit 710, a downsampling unit 720, and a DSI adjustment unit 730. The DSI adjustment unit 730 may comprise an SI control coefficient generator 732, a signal shaper 734, and an SI canceller 736.

The oversampling unit 710 may sample an input signal at an R-times sampling frequency, and output the sampled signal to the signal shaper 734.

The downsampling unit 720 may decimate a signal input from the SI canceller 736 into samples of an original signal, and output the decimated signal. That is, the downsampling unit 720 may downsample the R-times sampled signal in the oversampling unit 710 into the original signal, and output the downsampled signal to the signal recovery unit 820.

Hereinafter, a time-domain signal in the digital domain with respect to the SI signal (i.e., the original signal in the digital domain of the SI signal) will be referred to as a reference signal. In the present disclosure, the reference signal may refer to a signal in the digital domain before or after the oversampling according to an embodiment of the present disclosure.

The SI control coefficient generator 732 may generate signal shaping (or, wave shaping (WS)) coefficients to minimize non-linearity of the SI signal to be transmitted. After generating the shaping coefficients, the SI control signal coefficient generator 732 may generate channel estimation (CHE) coefficients by estimating IFD transmission and reception channel components to cancel the SI signal input to the DSIC processing unit 700. The SI control coefficient generator 732 may output the generated WS coefficients to the signal shaper 734 and output the CHE coefficients to the SI canceller 736.

The signal shaper 734 may form a transmission signal based on the WS coefficients input from the SI control coefficient generator 732. The signal shaper 734 may output the formed transmission signal to the DAC 610.

The SI canceller 736 may generate a control signal for canceling the received SI signal based on the CHE coefficients input from the SI control coefficient generator 732. Then, the SI canceller 736 may generate the DS by canceling the actually-received SI signal based on the control signal in accordance with the synchronization from the reference time. The SI canceller 736 may then output the DS to the downsampling unit 720.

In the DSIC processing unit 700 according to the first embodiment of the present disclosure, entire functions of the DSI adjustment unit 730 may operate in the oversampling time domain. Therefore, points A1, A2, and A3 at which the signal input to the DSI adjustment unit 730 is acquired may be located on a path of the oversampling time domain.

As illustrated in FIG. 4, the point A1 may be located between the oversampling unit 710 and the DSI adjustment unit 730, the point A2 may be located between the first ADC 620 and the DSI adjustment unit 730, and the point A3 may be located between the second ADC 625 and the DSI adjustment unit 730. As described above, the points A1, A2, and A3 for acquiring the signal input to the DSI adjustment unit 730 may be located on the time-domain path of the oversampling domain, and the DSI adjustment unit 730 may perform signal processing based on the number of samples in the oversampling domain.

Figure 5:
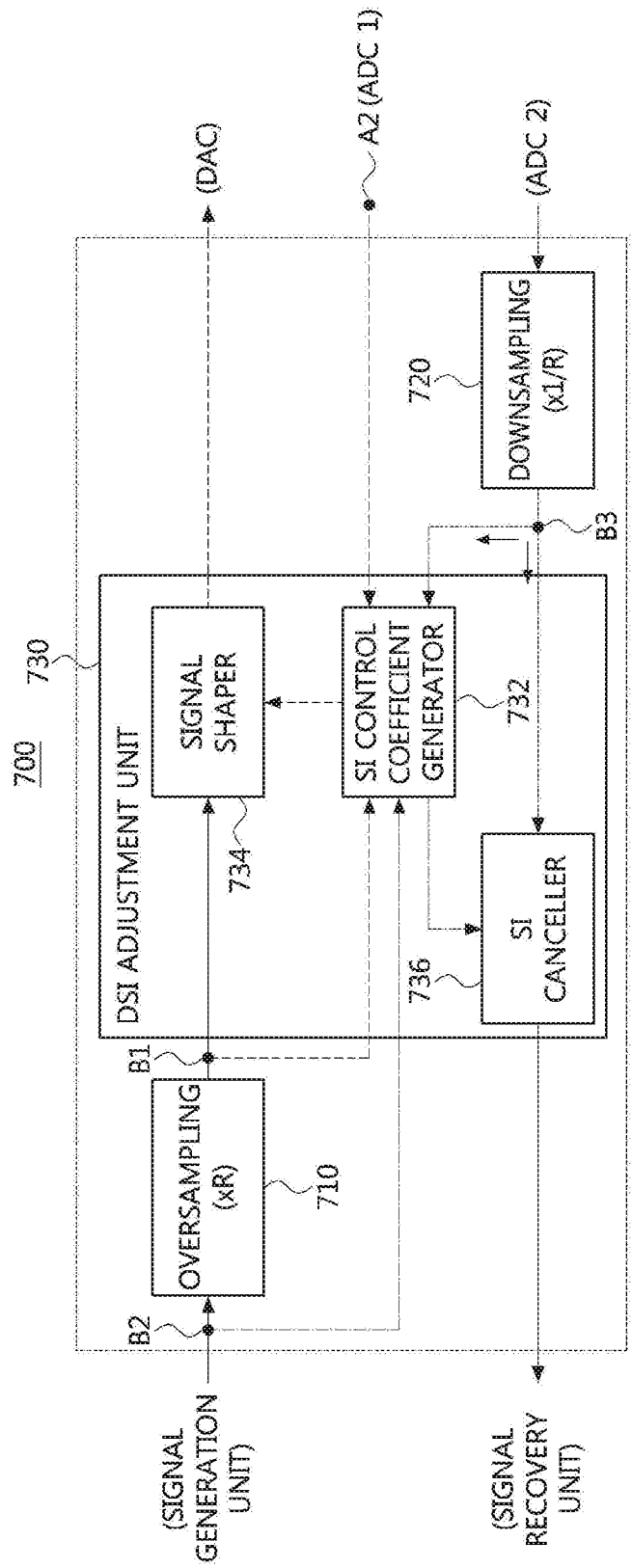
FIG. 5 is a block diagram illustrating a DSIC processing unit according to a second embodiment of the present disclosure.

FIG. 5 is a block diagram illustrating a DSIC processing unit according to a second embodiment of the present disclosure.

Referring to FIG. 5, the DSIC processing unit 700 according to a second embodiment of the present disclosure may comprise an oversampling unit 710, a downsampling unit 720, and a DSI adjustment unit 730. The DSI adjustment unit 730 may include an SI control coefficient generator 732, a signal shaper 734, and an SI canceller 736.

The oversampling unit 710 may sample an input signal at an R-times sampling frequency, and output the sampled signal to the signal shaper 734.

The downsampling unit 720 may decimate a signal input from the second ADC 625 into samples of an original signal, and output the decimated signal to the SI control coefficient generator 732 and the SI canceller 736.

The SI control coefficient generator 732 may generate WS coefficients to minimize non-linearity of the SI signal to be transmitted. After generating the shaping coefficients, the SI control signal coefficient generator 732 may generate CHE coefficients by estimating IFD transmission and reception channel components to cancel the SI signal input to the DSIC processing unit 700. The SI control coefficient generator 732 may output the generated WS coefficients to the signal shaper 734 and output the CHE coefficients to the SI canceller 736.

The signal shaper 734 may form a transmission signal based on the WS coefficients input from the SI control coefficient generator 732. The signal shaper 734 may output the formed transmission signal to the DAC 610.

The SI canceller 736 may generate a control signal for canceling the received SI signal based on the CHE coefficients input from the SI control coefficient generator 732. Then, the SI canceller 736 may generate the DS by canceling the actually-received SI signal based on to the control signal in accordance with the synchronization from the reference time. The SI canceller 736 may then output the DS to the signal recovery unit 820.

The DSIC processing unit 700 according to the second embodiment of the present disclosure may estimate an SI channel by operating the SI control coefficient generator 732 in a downsampling domain. That is, the DSIC processing unit 700 according to the first embodiment described with reference to FIG. 4 operates the SI control coefficient generator 732 in the oversampling domain, but the DSIC processing unit 700 according to the second embodiment illustrated in FIG. 5 operates the SI control coefficient generator 732 in the downsampling domain.

Also, the DSIC processing unit 700 according to the second embodiment of the present disclosure may cancel the SI signal by operating the SI canceller 736 in the downsampling domain. That is, the DSIC processing unit 700 according to the first embodiment described with reference to FIG. 4 operates the SI canceller 736 in the oversampling domain, but the DSIC processing unit 700 according to the second embodiment illustrated in FIG. 5 operates the SI canceller 736 in the downsampling domain.

As described above, in the DSIC processing unit 700 according to the second embodiment of the present disclosure, the functions of the SI control coefficient generator 732 and the SI canceller 736 may operate in the downsampling time domain. Therefore, a point B1 for acquiring the signal input to the DSI adjustment unit 730 may be located at the output end of the oversampling unit 710, and a point B2 for acquiring the signal input to the DSI adjustment unit 730 may be located at the input end of the oversampling unit 710. Also, a point B3 for acquiring the signal input to the SI control coefficient generator 732 may be located at the output end of the downsampling unit 720, and the point B3 may be located at the path of the downsampling domain. As described above, the points B1, B2, and B3 may be located on the time-domain path of the downsampling domain, and the DSI adjustment unit 730 may perform signal processing based on the number of samples in the downsampling domain.

FIGS. 6A and 6B are diagrams illustrating an IFD frame structure according to an embodiment of the present disclosure, which illustrate training periods and data transmission periods.

Referring to FIGS. 6A and 6B, an IFD frame 910 according to an embodiment of the present disclosure may be for performing the SIC, and may comprise training periods 911 and 912, a guard period 914, and a data transmission period 913. The training periods may include a WS training period 911 and a SI CHE training period 912.

The WS training period 911 may be a period for transmitting a first training signal for generating the WS coefficients in the SI control coefficient generator 732. The SI CHE training period 912 may be a period for transmitting a second training signal for the SI channel estimation in the SI control coefficient generator 732.

The guard period 914 may be a period for protecting the IFD transceiver to operate stably while performing the training operation. The guard period 914 may be disposed in the IFD frame 910 in order to avoid inter-symbol interference (ISI), control a system latency in the IFD transceiver, and perform a gain control for preventing saturation of the ADC.

In the guard period 914, a transmission signal may be freely configured for the purposes such as the ISI avoidance, the control of the system latency in the IFD transceiver, and the gain control for preventing saturation of the ADC. Also, the guard period 914 may be freely arranged within a transmission signal unit for the purposes such as the ISI avoidance, the control of the system latency in the IFD transceiver, and the gain control for preventing saturation of the ADC.

In the WS training period 911 and the SI CHE training period 912, a promised signal such as a training sequence or a training symbol may be transmitted and received between a transmitting apparatus and a receiving apparatus.

In the training periods 911 and 912, a first training signal may be used for generating the WS coefficients in the SI control coefficient generator 732. Also, in the training periods 911 and 912, a second training signal may be used for generating the SI CHE coefficients.

Accordingly, the first and second training signals transmitted in the training periods 911 and 912 may be previously calculated and stored, in form of a basis, in a basis storage unit in the DSI adjustment unit 730.

Also, the first and second training signals may be signals promised among the IFD transceivers, and there may not be any particular limitation on the types and lengths of the first and second training signals. In addition, the first and second training signals transmitted in the WS training period 911 and the SI CHE training period 912 may be configured as training signals different from each other or the same training signals.

In the IFD frame 910, time units may be largely composed of a transmission frame unit time $T_f$, transmission signal unit times such as $T_{s1}$ and $T_{s2}$, and an SI WS coefficient update unit time $T_r$. The transmission frame unit time $T_f$ may correspond to a time unit of a single frame including at least one WS training period and at least one SI CHE training period.

$T_r$ may denote a time interval at which the WS training period 911 is disposed, and may be set to a time obtained by adding a time corresponding to one or a plurality of the transmission signal units and a time $T_a$ corresponding to a rest period. The rest period corresponding to $T_a$ may mean a period in which signal transmission is empty due to channel occupancy of other nodes or the like. Therefore, a large number of $T_f$, $T_{s1}$, $T_{s2}$, and $T_a$ may exist within $T_r$.

As shown in FIG. 6A, the WS training period 911 and the SI CHE training period 912 may be sequentially arranged before the data transmission period 913 within one transmission signal unit time $T_{s1}$. Also, the SI CHE training period 912 and the data transmission period 913 may be arranged within one transmission signal unit time $T_{s2}$. That is, the transmission signal unit time $T_{s1}$ may include the WS training period 911, the SI CHE training period 912, and the data transmission period 913. The transmission signal unit time $T_{s2}$ may include the SI CHE training period 912 and the data transmission period 913.

As shown in FIG. 6A, one WS training period 911 may be arranged with the long time interval $T_r$. As another example, as shown in FIG. 6B, the WS training period 911 may be arranged for each transmission signal unit time $T_{s1}$ or $T_{s2}$.

However, without being limited thereto, the WS training period 911 and the SI CHE training period 912 may be continuously configured within a single transmission signal unit time in which a phase change of a radio channel is not large. There may be no restriction on the number of the WS training periods 911 and the SI CHE training periods 912 within the transmission frame unit time $T_f$. Also, one SI WS training period 911 and one SI CHE training period 912 may be arranged within one transmission signal unit time period $T_{s1}$ or $T_{s2}$, or a plurality of the SI WS training periods 911 and a plurality of the SI CHE training periods 912 may be arranged within one transmission signal unit time period $T_{s1}$ or $T_{s2}$.

FIGS. 7A and 7B are diagrams for a method of arranging training periods in a WLAN PHY frame.

Referring to FIGS. 7A and 7B, the transmission signal unit times $T_{s1}$ and $T_{s1}$ shown in FIGS. 6A and 6B may be configured according to a WLAN frame format 920.

As an example illustrated in FIG. 7A, a preamble may be arranged in the WLAN frame 920, and then a WS training period 921, an SI CHE training period 922, and a guard period 923 may arranged sequentially. The data transmission period 924 may be arranged after the guard period 923.

It may be possible to inform other nodes, through the preamble arranged in the frame, that the frame is a WLAN frame having the IFD functionality. Thereafter, the WS training period 921 may be protected from interference signals from other nodes, and training periods of other nodes may be protected through the guard period 923. The data transmission may be performed by arranging the data transmission period 924 after the guard period 923.

The peer node may also perform the SI training procedure during the guard period 923 by configuring the preamble, the WS training period 921, the SI CHE training period 922, and the guard period 923.

Also, the preamble, the SI CHE training period 922, and the guard period 923 may arranged again as shown in FIGS.

7A and 7B so as to repeatedly perform the SI channel estimation according to a change in the SI channel after a predetermined time, and the channel estimation may be performed while protecting the SI training period of the correspondent node.

The structure of the WLAN frame 920 shown in FIGS. 7A and 7B may be used for a case where a network coordinator acting as a master controls wireless accesses in in a IFD pairwise communication system while ensuring an SI training period of a slave node. In the case of the system in which a SI training sequence is determined based on additional information between the master and the slave, the preamble may be placed after the guard period 930.

As another example illustrated in FIG. 7B, a preamble may be arranged in the WLAN frame 920, and then an SI WS training period 921, an SI CHE training period 922, and a data transmission period 924 may be arranged. That is, the guard period 924 may not be arranged in the WLAN frame 920.

In the structure of the WLAN frame 920 of FIG. 7B, there should be no interference signals input from other nodes during the SI training period. Therefore, an information bit for indicating that the frame is a WLAN frame having the IFD functionality may be configured in the preamble so that the SI training period can be protected.

Also, in the data transmission period 924, a signal of another node may be received while a signal is transmitted to another node. Therefore, in the WLAN communication system in which a network coordinator having the IFD functionality and a plurality of nodes having the HD functionality are mixed, the network coordinator having the IFD functionality may provide channel occupancy information and network synchronization to the plurality of nodes by using the WLAN frame 920 of FIG. 7B, thereby ensuring the SI training periods. Also, the preamble and the SI CHE training period 922 may arranged so as to repeatedly perform the SI channel estimation according to a change in the SI channel after a predetermined time, and the channel estimation may be performed while protecting the SI training periods of itself and the correspondent node.

In general, a long term evolution (LTE) frame may have a structure divided into an uplink (UL) duration and a downlink (DL) duration in order to support a half duplex frequency division multiplexing (HD FDD) scheme or an HD time division multiplexing (HD TDD) scheme. Here, the DL may be a link in which downlink signal transmission is performed from an LTE base station to an LTE node, and the UL may be a link in which uplink signal transmission is formed from an LTE node to an LTE base station.

In the present disclosure, the LTE node may be a mobile cell or small cell base station, a relay, or the like as well as an LTE terminal, and the LTE base station may be a mobile cell or small cell base station, a relay, or the like as well as a macro cell base station. Unlike the above-described HD scheme, the IFD scheme may use simultaneously an entire duration of one frame, excluding the training periods, for UL/DL transmissions, without allocating the UL duration and the UL duration to one frame. Therefore, in the embodiments of the present disclosure, as shown in FIGS. 8 and 9, the training period and the data transmission period may be arranged in one transmission frame according to the LTE standard.

Figure 8:
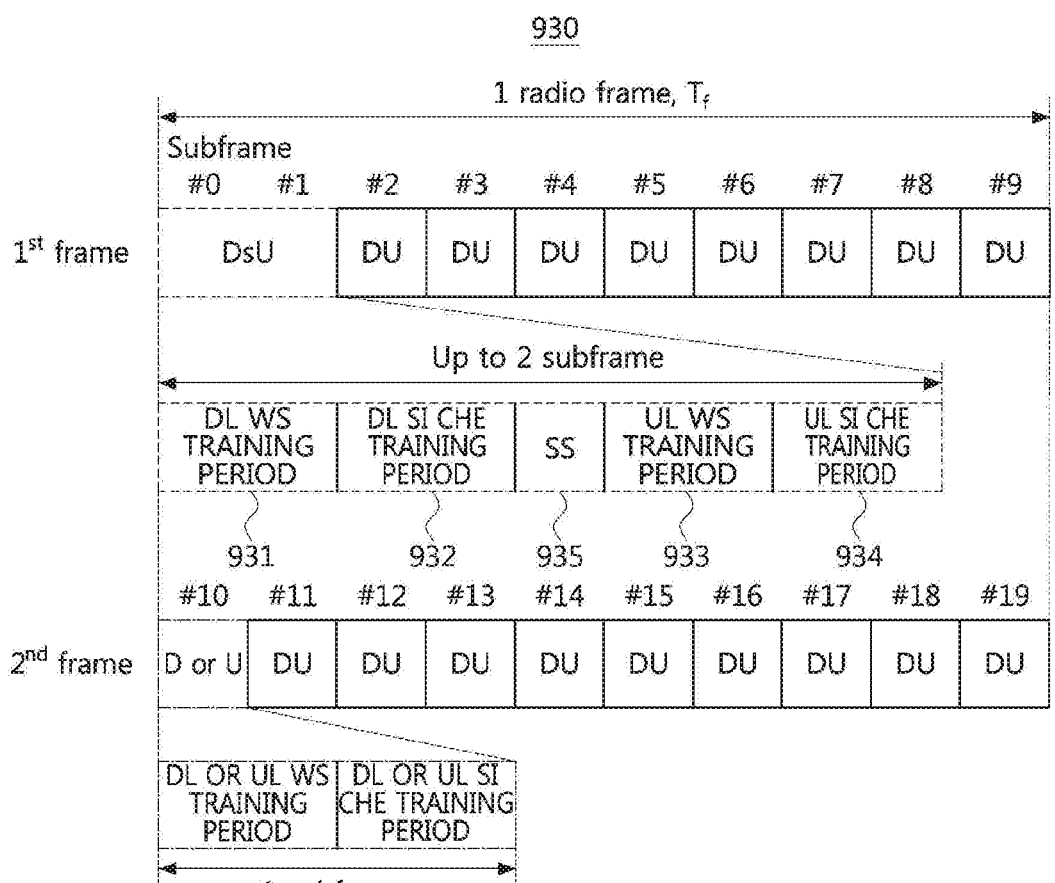
FIG. 8 is a diagram illustrating an example of a method of configuring training periods and transmission signals in a 3GPP LTE frame.
Figure 9:
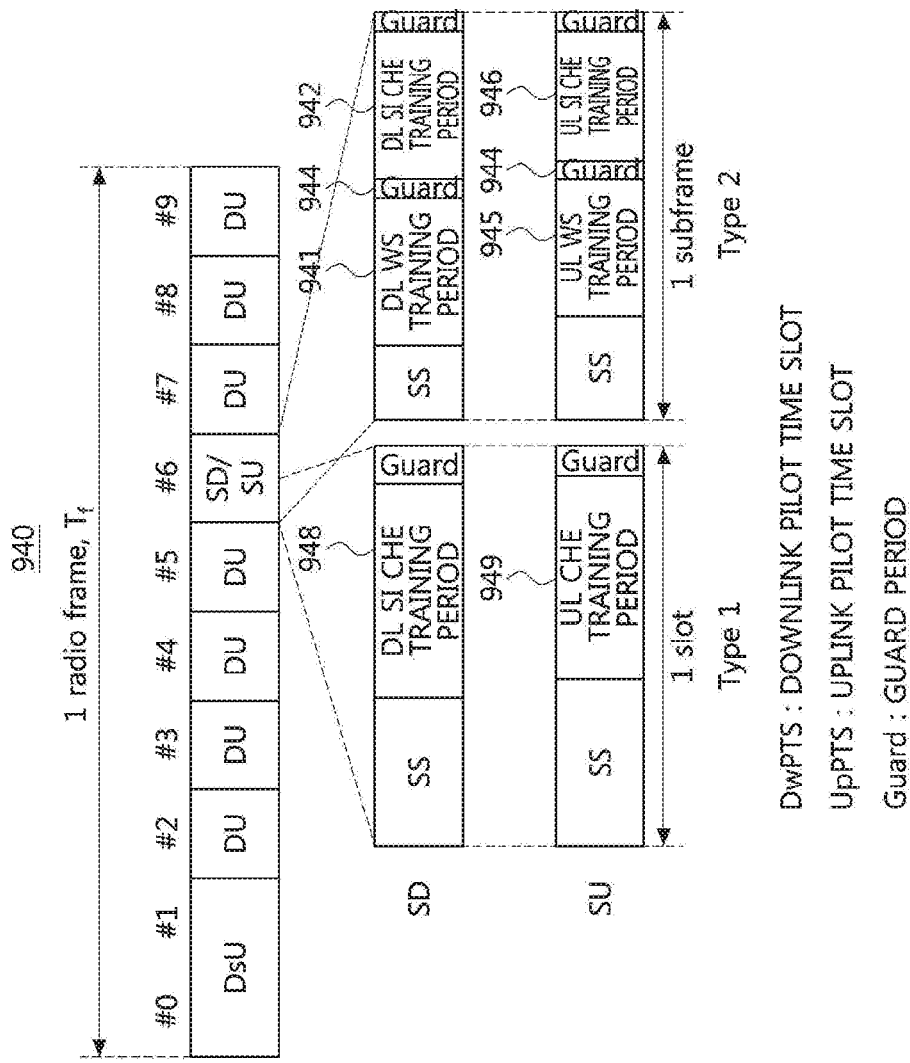
FIG. 9 is a diagram illustrating another example of a method of configuring training periods and transmission signals in a 3GPP LTE frame.

FIG. 8 is a diagram illustrating an example of a method of configuring training periods and transmission signals in a 3GPP LTE frame.

Referring to FIG. 8, in a 3GPP LTE frame 930, a subframe 'DsU' may denote a subframe for performing SI training for the DL and SI training for the UL. In FIG. 8, 'D' may denote a DL subframe, and 'U' may denote a UL subframe. Also, 'DU' may denote a subframe in which the DL and the UL are simultaneously formed according to the IFD scheme.

During a DL WS training period 931 and a DL SI CHE training period 932, the IFD LTE base station may perform the WS training and the SI CHE training for itself. Also, during a UL WS training period 933 and a UL SI CHE period 934, the IFD LTE node (e.g., terminal) may perform the WS training and the SI CHE training for itself in the same manner as the IFD LTE base station. A special subframe SS 935 (e.g., a special subframe of the LTE communication system) may be placed between the training period of the IFD LTE base station and the training period of the IFD LTE node. For example, the special subframe 935 may comprise a downlink pilot time slot (DwPTS), a guard period, and an uplink pilot time slot (UpPTS). Transmission of the DL or UL signal may be protected by the special subframe SS.

In a first frame or a frame acting like as the first frame, the SI training for the DL and the SI training for the UL may be sequentially performed in the first two subframes (i.e., DsU subframe). Then, from the second frame, the first subframe may selectively perform the SI training for the UL or the SI training for the DL. The 'D' subframe for the DL SI training period may include the DL WS training period 931 and the DL SI CHE training period 932. Also, the 'U' subframe for the UL SI training period may include the UL WS training period 933 and the UL SI CHE training period 934.

FIG. 9 is a diagram illustrating another example of a method of configuring training periods and transmission signals in a 3GPP LTE frame.

Referring to FIG. 9, in a 3GPP LTE frame 940, 'SD' may mean a special DL subframe located between data transmission periods DUs. Also, 'SU' may mean a special UL subframe located between data transmission periods DUs.

In the case that the SI CHE training is desired to be repeated according to a change of the SI channel after a predetermined time, when the DsU, D or U subframe is transmitted, the WS training and the SI CHE training may be performed again according to the change of the non-linearity of the SI signal by using the special DL subframe and the special UL subframe.

Such the special DL or UL frame may be freely or fixedly arranged in one frame unit. For this, in the SD or SU subframe, a special subframe SS may be placed in front of the DL SI WS training period 941. Also, a guard period 944 may be disposed between the DL WS training period 941 and the DL SI CHE period 942.

The special subframe SS may be arranged in front of the UL WS training period 945 and the UL SI CHE period 946. The guard period 944 may be placed between the UL WS training period 945 and the UL SI CHE period 946. Herein, the time units of the DL WS training period 941, the DL SI CHE period 942, the special subframe SS, the guard period 944, the UL WS training period 945, the UL SI CHE period 946, and the special subframe SS may be variably configured according to the system to which it is applied. For example, the special subframe SS in the SD may consist of a DwPTS, a guard period and an UpPTS. Alternatively, the special subframe SS may consist of at least one of a DwPTS and an UpPTS.

The first type (Type 1) SD may be configured within a single slot (1 slot) as a subframe consisting of a DL SI CHE training period 948. The first type 1 (Type 1) SU may be configured within a single slot (1 slot) as a subframe consisting of a UL SI CHE training period 949.

The second type (Type 2) SD may be configured within a single subframe (1 subframe) as a subframe consisting of a DL SI WS training period 941 and a DL SI CHE training period 942. The second type (Type 2) SU may be configured within a single subframe (1 subframe) as a subframe consisting of a UL SI WS training period 945 and a UL SI CHE training period 946.

In the LTE network in which an IFD LTE base station and a plurality of IFD LTE nodes are mixed, the LTE frame structure shown in FIGS. 8 and 9 may provide the SI training periods to the plurality of terminals while securing the SI training periods so that the base station maintains its SIC performance against the change of SI non-linearity and the change of channel. Also, in the LTE network in which an IFD LTE base station and a plurality of IFD LTE nodes are mixed, when the LTE frame is configured with the DL, D, or SD subframes, the subframes may be placed in a fixed period, so that the SIC performance of the base station can be maintained while enhancing the transmission efficiency of the network.

Figure 10:
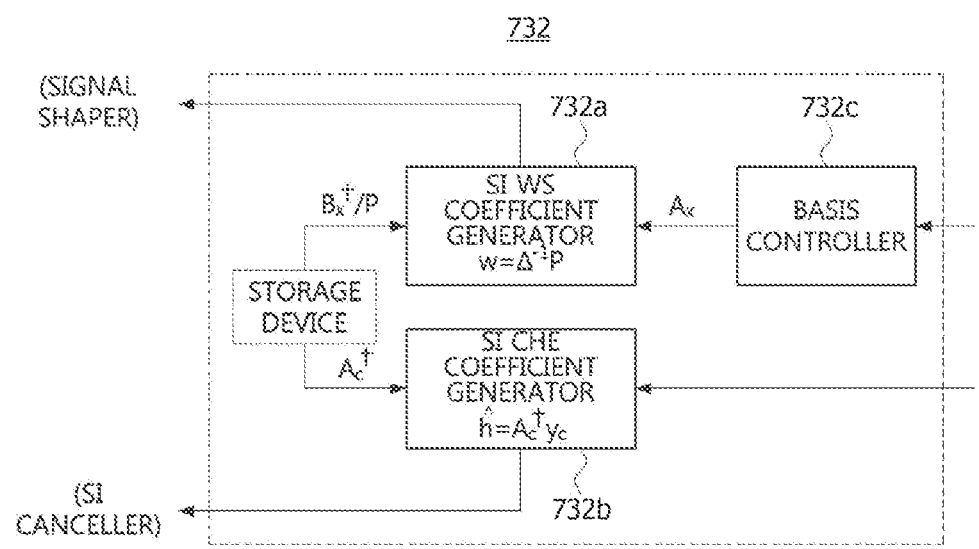
FIG. 10 is a block diagram illustrating the SI control coefficient generator in FIG. 4.

FIG. 10 is a block diagram illustrating the SI control coefficient generator in FIG. 4.

Referring to FIG. 10, the SI control coefficient generator 732 may comprise an SI WS coefficient generator 732a, an SI CHE coefficient generator 732b, a basis controller 732c, and a storage device (or DSP).

The SI WS coefficient generator 732a may compare a signal reflecting non-linear characteristics with a digital domain reference signal having no non-linear characteristic, and may generate WS coefficients having low non-linearity. The SI CHE coefficient generator 732b may estimate a channel variation between the reference signal and the received SI signal to cancel the received SI signal, and generate CHE coefficients for reconstructing the reference signal to the received SI. The basis controller 732c may generate a combination $A_x$ of bases constituting a non-linear system for a specific signal, and transmit the generated combination to the SI WS coefficient generator 732a.

With reference to FIGS. 4 and 5, a method of generating a basis matrix, performed in the SI control coefficient generator 732, will be explained.

Assuming that a signal at the point A2 shown in FIGS. 4 and 5 is s, the basis matrix $A_s$ for the signal s may be expressed by Equation 1 below.

$$s = [s_0 \; s_1 \; \ldots \; s_{N-1}]^T \quad \text{[Equation 1]}$$

$$A_s = [A_1 \; \ldots \; A_M] \text{ for } s$$

$$A = toep(A) = \begin{bmatrix} s_{-a} & \cdots & s_{-1} & s_0 & \cdots & s_{a-1} \\ \vdots & \ddots & \vdots & s_1 & \ddots & \vdots \\ s_{N-a} & \cdots & s_{N-2} & s_{N-1} & \cdots & s_{N+a-1} \end{bmatrix}$$

In Equation 1, N is the number of samples, a is a memory length of a Toeplitz matrix, and $A_M$ is a Toeplitz matrix for a sub-basis which can be generated by the signal s.

Here, the basis matrix $A_s$ may be composed of a combination of Toeplitz matrices for multiple sub-bases. Here, the sub-basis may be a term of a polynomial that represents a non-linear system. For example, the sub-basis of $A_M$ may be expressed by Equation 2 below.

$$A_1 \supset \{s, s^*\} \quad \text{[Equation 2]}$$

$$A_3 \supset \{s|s|^2\} \text{ or } \{ss^*s, sss, s^*s^*s^*\}$$

$$A_M \supset \{s|s|^{2(M-1)}\} \text{ or } \{\underbrace{ss\ldots s}_{M}, \underbrace{ss^*\ldots s}_{M}, \ldots\}$$

Since the method of configuring the sub-basis may be dependent on the non-linear system, it may be configured as a single term included in the non-linear polynomial. Also, the basis matrixes $A_x$, $B_x$, $A_c$, and $A_d$ may be generated according to the basis matrix generation rule of Equation 1.

The signal shaper 734 of the DSI adjustment unit 730 may receive the WS coefficients $w^i$ generated by the SI control coefficient generator 732, and may form a transmission signal of the SI CHE training period and the data transmission period. When the signals transmitted in the SI CHE training period and the data transmission period are X, and $X_d$, respectively, the operation of shaping the signal in the signal shaper 734 may be expressed by Equations 3 and 4 below.

$$v_c = A_c w^i \quad \text{[Equation 3]}$$

$$v_d = A_d w^i \quad \text{[Equation 4]}$$

In Equations 3 and 4, $v_c$ and $v_d$ may represent the output of the signal shaper 734, and $A_c$ and $A_d$ may refer to the basis matrices for the reference signals $X_c$ and $X_d$.

Figure 11:
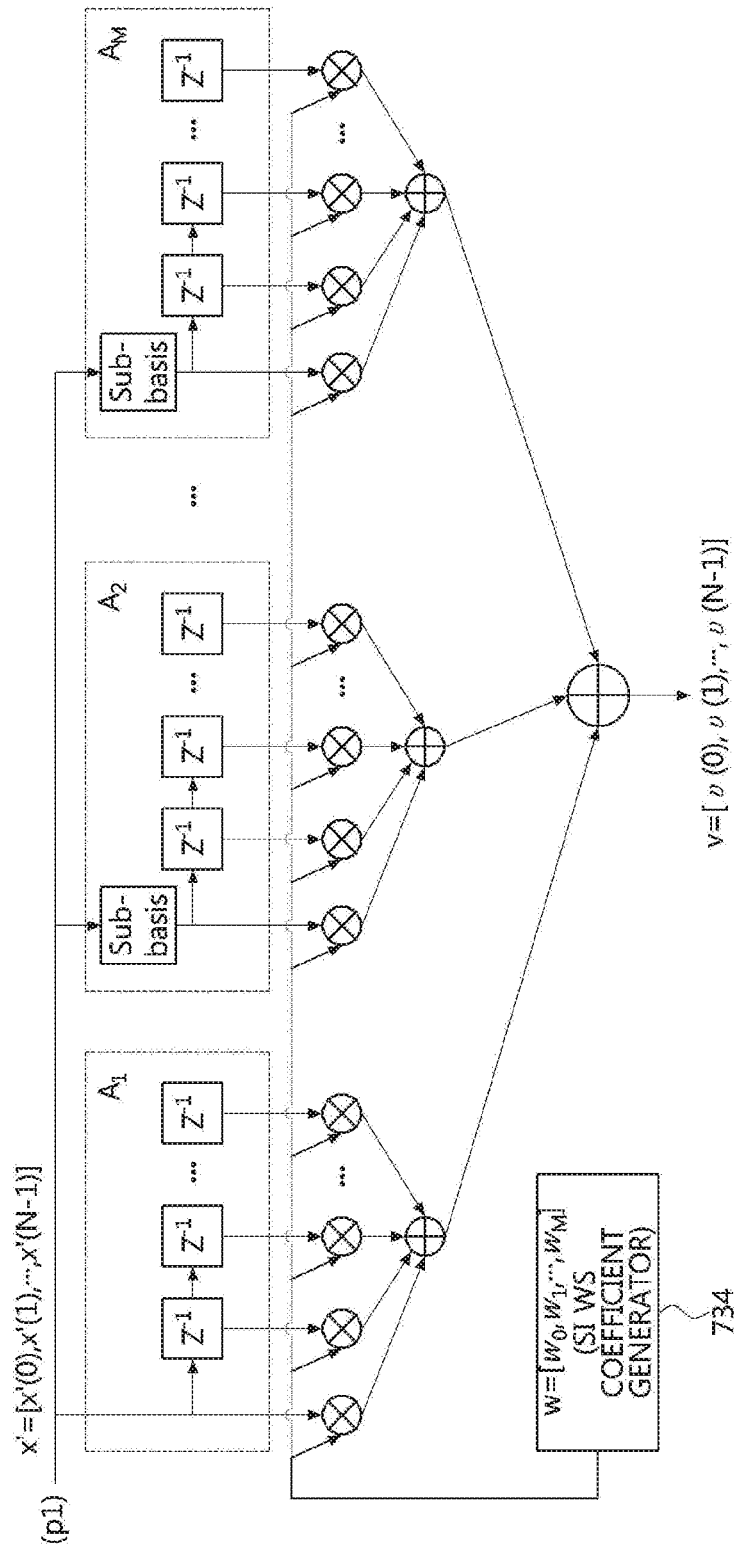
FIG. 11 is a diagram illustrating an example of a signal shaping method.

FIG. 11 is a diagram illustrating an example of a signal shaping method.

Referring to FIG. 11 together with FIGS. 3 to 5, there is illustrated an example of a signal shaping method performed by Equations 3 and 4. The SI WS coefficient generator 734a may be configured in form of a finite impulse response (FIR) filter configured with delay taps and tap coefficients (WS coefficients, $w^i$) with respect to the sub-basis of each of the signals $X_c$ and $X_d$ inputted at the position A1 of FIG. 4 and the position B1 of FIG. 5. Also, the SI WS coefficient generator 734a may combine all of the FIR filter outputs to produce a final output signal.

The signal shaper 734 may modify the signal amplitude and phase by the WS coefficients $w^i$ designed to reduce the non-linearity of the final transmitted output signal. Therefore, the output signal that has passed through the signal shaper 734 may pass through the DAC 610 and the amplifier of the RF signal processing unit 500 of the transmitting end, so that the non-linear characteristic is lowered. As a result, the non-linearity of the SI signal may also be made smaller.

The SI WS coefficient generator 734a may receive the basis matrix $A_s$ generated by the digital oversample signal at the point A2 in FIG. 4 and FIG. 5 and the basis matrix of the reference signal at the point A1 of FIG. 4 and the point B1 of FIG. 5. Also, the SI WS coefficient generator 734a may generate WS coefficients that cause the signal at point A2 to be a linear signal identical to the signals at the points A1 and B1.

Here, the signal at the point A2 is a signal obtained by feeding back the output signal of the transmission RF processing unit 510 shown in FIG. 3 as a digital domain signal. Such the signal fed back as the digital domain signal may include band limited characteristics for non-linear distortion by the RF analog components of the transmission path. Also, the signals at the points A1 and B1 are original signals in the digital domain, and are reference signals that do not reflect RF analog characteristics.

Figure 12:
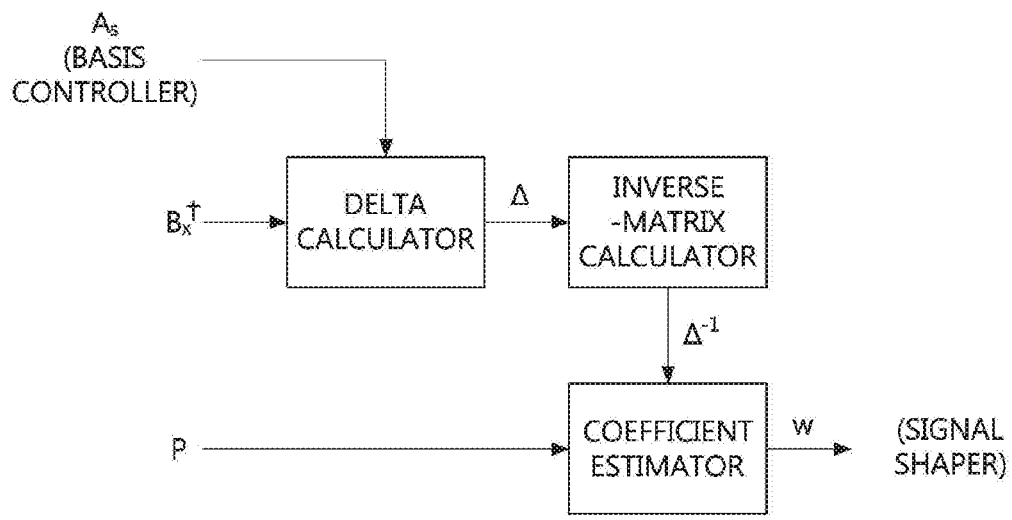
FIG. 12 is a diagram illustrating a method of generating SI WS coefficients.

FIG. 12 is a diagram illustrating a method of generating SI WS coefficients.

Referring to FIG. 12, the SI WS coefficient generator 734a may include a delta calculator, an inverse matrix calculator, and a coefficient estimator to perform the signal shaping operations described with reference to FIG. 11. The delta calculator may substitute the basis matrix $A_s$ for the non-linear signal generated by the basis controller 734c with a special basis matrix for the reference signal.

The basis matrix $A_s$ generated by the signal at the point A2 shown in FIGS. 4 and 5 has a characteristic of changing in real time with respect to the input signal. Accordingly, a pseudo inverse matrix of $A_s$ required for the operation of generating WS coefficients may be stored in advance in the memory, and the basis matrix $A_s$ may be generated in real time. In the present disclosure, the method of substituting the basis matrix $A_s$ with the pseudo-inverse matrix $B_x^\dagger$ of the special basis matrix is performed, and the changed non-linearity of the can be detected quickly by quickly providing the pseudo-inverse matrix of the basis matrix $A_s$.

The delta calculator may calculate a difference Δ between the pseudo-inverse matrix $B_x^\dagger$ of the special basis matrix generated from the reference signal x and the basis matrix $A_s$ for the signal passing through the non-linear system, as expressed by Equation 5 below. The reference signal x is a WS training signal transmitted in the WS training period shown in FIGS. 6 to 9.

$$\Delta = B_x^\dagger A_s \quad \text{[Equation 5]}$$

Here, the special basis matrix $B_x$ for substituting the basis matrix $A_s$ may be represented by Equations 6 and 7 below.

$$B_x = [B_1 \ldots B_M] \text{ for } u \quad \text{[Equation 6]}$$

$$u = f(x, L)$$

$$L = [l_1 \ldots l_K]^T \quad \text{[Equation 7]}$$

In Equation 6, $B_M$ may be represented by a Toeplitz matrix of a sub-basis that can be generated by u in Equation 7, where u is a predictive non-linear signal that has passed through an arbitrary non-linear system f(·) with respect to the reference signal x. Here, L is a coefficient for controlling an arbitrary non-linear system, and the length k of the vector may be variably set. The pseudo-inverse matrix $B_x^\dagger$ of the basis matrix may be configured in advance, and the pseudo-inverse matrix of the basis matrix may be stored in the memory to enhance the system processing efficiency.

The inverse-matrix calculator may calculate an inverse matrix $\Delta^{-1}$ of the M×M square matrix Δ. According to the size of M, the inverse-matrix calculator may be separately configured in an apparatus capable of fast calculation. Also, in order to increase the speed of computation, the inverse-matrix calculator may be implemented in the manner of updating stored values.

The coefficient estimator may receive the output of the inverse-matrix calculator and the basis matrix P from the storage device (or DSP) of FIG. 10, and calculate the WS coefficients w as expressed in Equation 8 below.

$$w^i \Delta^{-1} P$$

$$w^i = [w_1 \ldots w_M]^T$$

$$P = B_x x = [p_1 \ldots p_M]^T \quad \text{[Equation 8]}$$

In Equation 8, the basis vector P may be a vector for a reference signal shaping value by the predicted non-linear system, which is calculated in advance and stored in the storage device (or DSP). Here, i is an update number of the WS coefficients according to the number of repetitions of the SI WS training period. Also, the length of the outputted WS coefficient vector $w^i$ and the basis vector P may be the same as the number M of sub-bases configured in the basis controller 734c.

The SI CHE coefficient generator 734b may receive basis matrixes for the SI signal (e.g., the signal at the point A3 of FIG. 4 or the signal at the point B3 of FIG. 5) received through the antenna and the reference signal transmitted at the SI CHE training period (i.e., SI CHE training signal), and estimator a channel variation between the two signals. Also, the SI CHE coefficient generator may output channel coefficients according to the channel variation between the two signals.

Here, the SI signal received through the antenna may correspond to the SI signal the non-linearity of which is reduced by the SI WS operation of the signal shaping unit 734.

When the training signal transmitted in the SI CHE period is represented by the reference signal $X_c$, the received SI signal inputted at the point A3 of FIG. 4 or the point B3 of FIG. 5 is represented by $Y_c$, and the pseudo-inverse matrix of the basis matrix for the reference signal $X_c$ in the storage device (or DSP) is represented by $A_c^\dagger$, the CHE coefficients $\hat{h}$ may be represented as Equation 9 below.

$$\hat{h} = A^\dagger y_c$$

$$A^\dagger \subset \{A_c^\dagger, A_z^\dagger\} \quad \text{[Equation 9]}$$

In Equation 9, the length of the CHE coefficients $\hat{h}$ may be the same as the number k of subbases of the pre-generated basis matrix. That is, it may correspond to the number of channel coefficients corresponding to each sub-basis of the basis matrix $A_c$ for reconstructing the received SI signal.

The SI control coefficient generator 732 may use a PA output signal which is inputted from the point A2 of FIGS. 4 and 5 as the reference signal. An input port of the PA output signal may be equal to an input port of the signal S which is inputted to the signal shaper 734. However, composition of the PA output signal may be different from composition of the signal S. When the PA output signal of the SI CHE training signal which is transmitted in the SI CHE training period is feedback to a digital domain, the reference signal may be the feedback PA output signal. When the training signal which is transmitted in the SI CHE training period is $X_c$ and the feedback PA output signal which is transmitted to the digital domain through the point A2 is $X_z$, the CHE coefficient $\hat{h}$ may be calculated using the pseudo inverse $A_z^\dagger$ of the basis matrix for the reference signal $X_z$ as shown in Equation 9.

Figure 13:
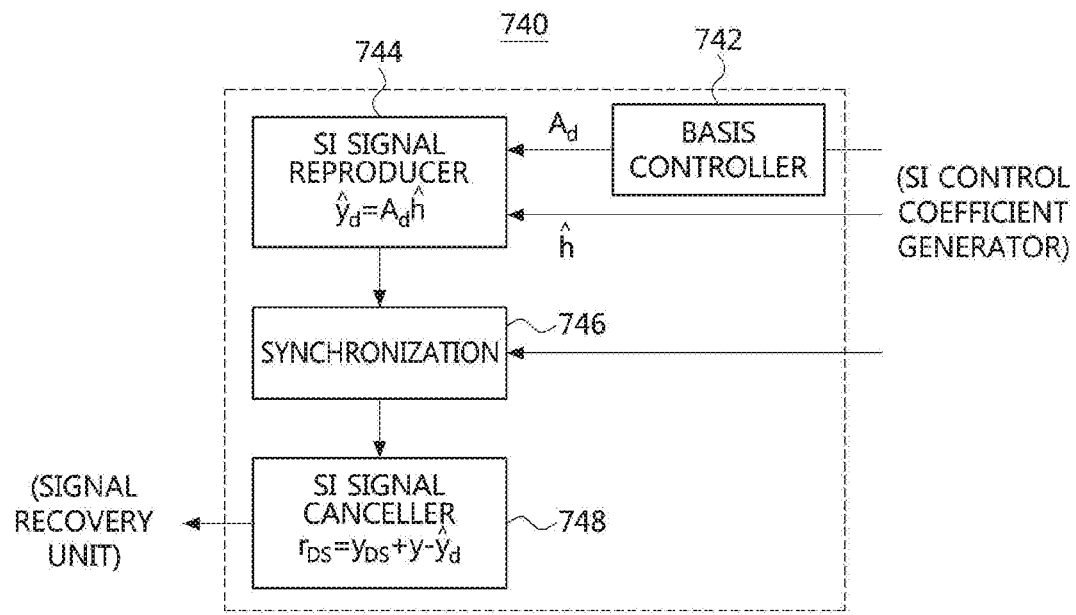
FIG. 13 is a block diagram illustrating an SI canceller.

FIG. 13 is a block diagram illustrating an SI canceller.

Referring to FIG. 13, the SI canceller may output the DS signal by offsetting the received SI signal and an SI control signal, which is an output signal of an SI signal reproducer, in the actual data transmission period. The SI canceller may comprise the SI signal reproducer, a basis controller, an SI signal canceller and a synchronization function.

First, the SI signal reproducer may receive the reference signal, the output for the channel estimation value of the SI channel estimator, and the bases for the original signal generated by the basis controller, and reproduce the received signal. The SI signal reproducer may perform the following operations. When the reference signal transmitted during the data transmission period is $X_d$ and the basis matrix generated based on the reference signal by the basis controller is $A_d$, the SI signal reproducer may reproduce an SI offset signal as shown in Equation 10 below.

$$\hat{y} = A\hat{h}$$

$$A \subset \{A_d, A_z\} \quad \text{[Equation 10]}$$

In Equation 10, the basis matrix $A_d$ generated by the basis controller may be generated through the same operation as the basis controller of the WS coefficient generator. When the SI CHE coefficient is generated using the feedback signal $X_z$ that the PA output signal is transmitted to the digital domain through the point A2, the basis controller of FIG. 10 may generate the basis matrix $A_z$ and the SI signal reproducer 744 may reproduce the SI offset signal as shown in Equation 10. However, the number and combination of sub-bases of the basis matrix $A_d$, the basis matrix $A_s$, and the basis matrix $A_z$ may be configured differently. The $A_s$ may be generated by the basis controller of the SI WS coefficient generator, and the $A_d$ and $A_z$ may be generated by the basis controller 742 of the SI canceller.

The synchronization function may perform sample synchronization between the SI control signal configured in the SI signal reproducer and the received SI signal input from the actual reception path. In the present disclosure, the synchronization function may largely perform a buffering function for the output signal of the SI signal reproducer and a function of detecting a starting point of the received SI signal. Therefore, a signal control method for adjusting the output time of the SI control signal, a signal processing method such as a cross-correlation based on the training signal, an autocorrelation synchronization detection technique, a transceiver RF analog hardware delay tracking method, or the like may be applied to the synchronization function.

The SI canceller may perform an operation of offsetting the SI control signal on which the synchronization function is performed and the received SI signal. When the SI signal received in the data transmission period is $y_d$, the SI control signal is $\hat{y}_d$, and the desired signal is $Y_{DS}$, the SI cancellation operation excluding noises may be expressed in Equation 11 below.

$$r_{DS} = y_{DS} + (y_d - \hat{y}_d) \quad \text{[Equation 11]}$$

In Equation 11, $r_{DS}$ is a desired signal input to the signal recovery unit after the SI is cancelled, and may include execution data for performing data decoding.

Therefore, after the SI WS operation of the transmitter, the sub-basis configuration of $A_c$ may be adjusted according to the degree of non-linearity of the SI signal input to the DSI adjustment unit of the receiver. For example, assuming that the non-linearity of the SI signal flowing into the antenna due to the SI WS is very small, when the non-linearity generated in the RF signal processing unit of the receiver is large, the sub-basis of $A_c$ may be expressed by Equation 12 below.

$$A_c = [A_1 \ldots A_M] \text{ for } x_c \quad \text{[Equation 12]}$$

In general, the sub-basis of the basis matrix $A_c$ may be composed of various combinations of linear signal components and non-linear signal components. Since the received SI signal has non-linear components as well as linear components, the received SI signal should be reproduced using a combination of the two signal components in order to cancel the SI.

The advantage of the SI channel coefficient generator proposed in the present disclosure is that the number of sub-bases of the $A_c$ may be minimized. For example, when the non-linearity of the SI signal flowing into the antenna becomes very small due to the SI WS and the non-linearity generated in the RF signal processing unit of the receiver is also small, the sub-basis of $A_c$ may be expressed by Equation 13 below.

$$A_c = A_1 \quad \text{[Equation 13]}$$

Since the non-linearity of the SI signal is lowered through the SI WS training operation, if there is no other non-linearity inducing factor, the SI signal received in the SI CHE training period and the data transmission period may be composed of the channel variation in the radio section and the white noises. Accordingly, in the present disclosure, the sub-basis for the reference signal may be configured, for SI channel estimation, as from a minimum of 1 (i.e., reference signal) to a maximum of a channel delay length. Here, the configuration of the sub-basis is not limited to the number of bases described above.

Figure 14:
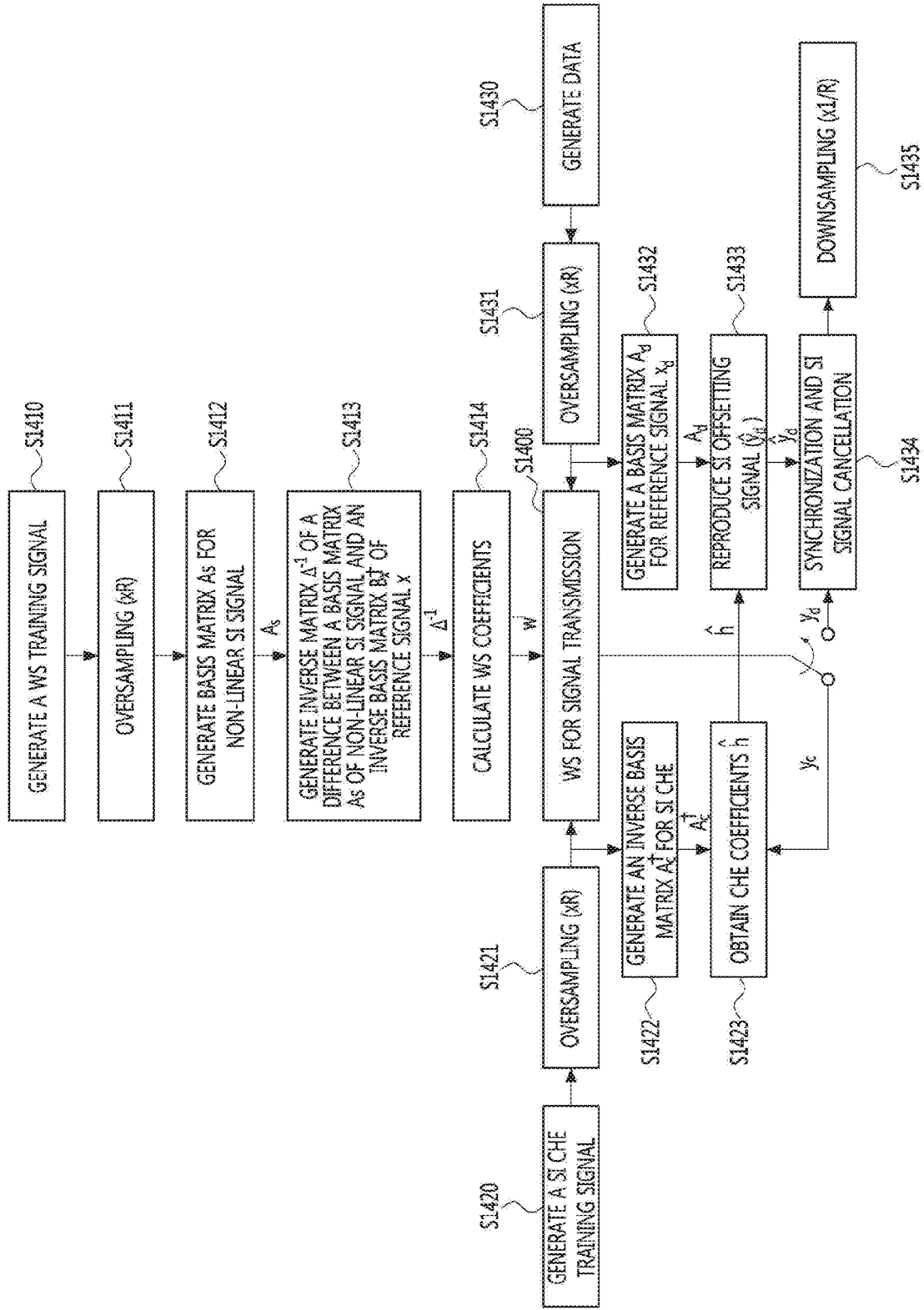
FIG. 14 is a flow chart illustrating a first embodiment of a method of cancelling a self-interference signal.

FIG. 14 is a flow chart illustrating a first embodiment of a method of cancelling a self-interference signal.

Referring to FIG. 14, the DSIC processing unit 700 (e.g., the DSI adjustment unit 730) of FIG. 7 may cancel the self-interference signals by sequentially performing the steps of FIG. 14. The DSIC processing unit 700 may sequentially perform a process #1 (steps S1410 to S1414 and S1400), a process #2 (steps S1420, S1421, S1400, S1422 and S1423), and a process #3 (step S1430, S1431, S1400, S1432 to S1435). The operations related to the processing of the SI WS training signal may be performed in the process #1, the operations related to the processing of the SI CHE training signal may be performed in the process #2, and the operations related to the processing of data may be performed in the process #3. Here, the processes #1 to #3 may be performed in the oversampling domain.

The signal generation unit 810 may generate the WS training signal (S1410). The WS training signal may be input to the oversampling unit 710 and the oversampling unit 710 may output the oversampled WS training signal. The oversampled WS training signal may be input to the DSI adjustment unit 730. The DSI adjustment unit 730 may perform steps S1411 to S1414, and step S1400. The basis matrix $A_s$ for the non-linear SI signal may be generated based on Equations 1 to 2 (S1412). The inverse matrix $\Delta^{-1}$ of the difference between the basis matrix $A_s$ for the non-linear SI signal and the inverse basis matrix $B_x^\dagger$ of the reference signal x may be generated based on Equations 5 to 7 (S1413). Also, the WS coefficients $w^i$ may be generated based on Equation 8 (S1414). The DSI adjustment unit 730 may form the WS training signal based on the WS coefficients $w^i$ (S1400). The formed WS training signal may be transmitted through the antenna unit 300.

The signal generation unit 810 may generate the SI CHE training signal (S1420). The SI CHE training signal may be input to the oversampling unit 710 and the oversampling unit 710 may output the oversampled SI CHE training signal (S1421). The oversampled SI CHE training signal may be input to the DSI adjustment unit 730. The DSI adjustment unit 730 may perform step S1400 and steps S1422 to S1423. The WS coefficients $w^i$ may be applied to the oversampled SI CHE training signal (S1400). The oversampled SI CHE training signal to which the WS coefficients $w^i$ are applied may be transmitted through the antenna unit 300. The inverse basis matrix $A_c^\dagger$ for the SI CHE may be generated (S1422). The CHE coefficients $\hat{h}$ may be obtained based on the inverse basis matrix $A_c^\dagger$ for the SI CHE and $y_c$ (S1423). The CHE coefficients $\hat{h}$ may be calculated based on Equation 9.

The signal generation unit 810 may generate the data (S1430). The data may be input to the oversampling unit 710 and the oversampling unit 710 may output the oversampled data (S1431). The oversampled data may be input to the DSI adjustment unit 730. The DSI adjustment unit 730 may perform step S1400 and steps S1432 to S1435. The WS coefficients $W^i$ may be applied to the oversampled data (S1400). The oversampled data to which the WS coefficients $w^i$ are applied may be transmitted through the antenna unit 300. The basis matrix $A_d$ of the reference signal $x_d$ may be generated (S1432), and the SI offsetting signal $\hat{y}_d$ may be reproduced (S1433). The SI offsetting signal $\hat{y}_d$ may be generated based on Equation 10. The synchronization and SI signal cancellation operation may be performed based on Equation 11 (S1434), and the signal generated in the step S1434 may be downsampled (S1435). That is, after completion the step S1435, the desired signal may be obtained.

Figure 15:
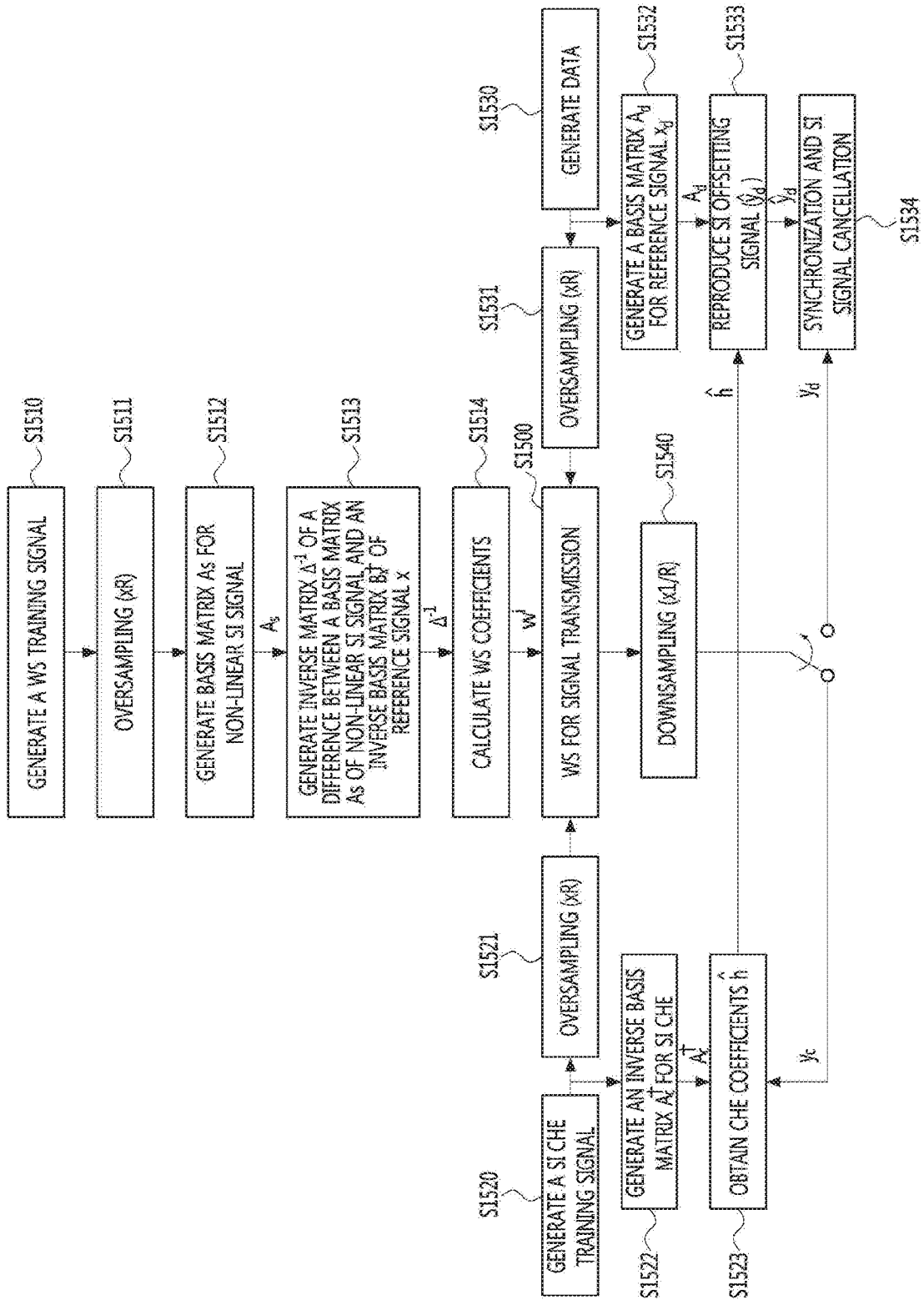
FIG. 15 is a flow chart illustrating a second embodiment of a method of cancelling a self-interference signal.

FIG. 15 is a flow chart illustrating a second embodiment of a method of cancelling a self-interference signal.

Referring to FIG. 15, the DSIC processing unit 700 (e.g., the DSI adjustment unit 730) of FIG. 8 may cancel the self-interference signals by sequentially performing the steps of FIG. 15. The DSIC processing unit 700 may sequentially perform a process #1 (steps S1510 to S1514 and S1500), a process #2 (steps S1520, S1521, S1500, S1540, S1522 and S1523), and a process #3 (step S1530, S1531, S1500, S1540, and S1532 to S1534). The operations related to the processing of the SI WS training signal may be performed in the process #1, the operations related to the processing of the SI CHE training signal may be performed in the process #2, and the operations related to the processing of data may be performed in the process #3. Here, the process #1 may be performed in the oversampling domain, and the processes #2 and #3 may be performed in the downsampling domain.

The signal generation unit 810 may generate the WS training signal (S1510). The WS training signal may be input to the oversampling unit 710 and the oversampling unit 710 may output the oversampled SI WS training signal. The oversampled WS training signal may be input to the DSI adjustment unit 730. The DSI adjustment unit 730 may perform steps S1511 to S1514, and step S1500. The basis matrix $A_s$ for the non-linear SI signal may be generated based on Equations 1 to 2 (S1512). The inverse matrix $\Delta^{-1}$ of the difference between the basis matrix $A_s$ for the non-linear SI signal and the inverse basis matrix $B_x^\dagger$ of the reference signal x may be generated based on Equations 5 to 7 (S1513). Also, the SI WS coefficients $w^i$ may be generated based on Equation 8 (S1514). The DSI adjustment unit 730 may form the WS training signal based on the WS coefficients $W^i$ (S1500). The formed WS training signal may be transmitted through the antenna unit 300.

The signal generation unit 810 may generate the SI CHE training signal (S1520). The SI CHE training signal may be input to the oversampling unit 710 and the oversampling unit 710 may output the oversampled SI CHE training signal. The oversampled SI CHE training signal may be input to the DSI adjustment unit 730. The DSI adjustment unit 730 may perform step S1500 and steps S1522 to S1523. The WS coefficients w may be applied to the oversampled SI CHE training signal (S1500). The oversampled SI CHE training signal to which the WS coefficients $w^i$ are applied may be transmitted through the antenna unit 300. The inverse basis matrix $A_c^\dagger$ for the SI CHE may be generated (S1522). The CHE coefficients $\hat{h}$ may be obtained based on the inverse basis matrix $A_c^{554}$ for the SI CHE and $y_c$ (S1523). The CHE coefficients $\hat{h}$ may be calculated based on Equation 9. Also, $y_c$ used in the step S1523 may be downsampled (S1540). Here, the steps S1522 and S1523 may be performed based on the SI CHE training signal to which the step S1521 is not applied.

The signal generation unit 810 may generate the data (S1530). The data may be input to the oversampling unit 710 and the oversampling unit 710 may output the oversampled data (S1531). The SI WS coefficients $w^i$ may be applied to the oversampled data (S1500). The oversampled data to which the SI WS coefficients $w^i$ are applied may be transmitted through the antenna unit 300. Meanwhile, the steps S1532 and S1534 may be performed based on the data to which the step S1531 is not applied. The basis matrix $A_d$ of the reference signal $x_d$ may be generated (S1532), and the SI offsetting signal $\hat{y}_d$ may be reproduced (S1533). The SI offsetting signal $\hat{y}_d$ may be generated based on Equation 10. The synchronization and SI signal cancellation operation may be performed based on Equation 11 (S1534), and $y_d$ used in the step S1534 may be downsampled (S1540). That is, after completion the step S1534, the desired signal may be obtained.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of an in-band full duplex (IFD) transceiving apparatus including a receiving end, a transmitting end, a digital self-interference cancellation (DSIC) processing unit, and a digital SI cancellation unit, the operation method comprising:
   generating, by the DSIC processing unit, signal shaping coefficients for wave shaping of a signal of the transmitting end;
   generating, by the DSIC processing unit, channel estimation coefficients for cancellation of a self-interference signal in a reception signal of the receiving end;
   forming, by the DSIC processing unit, a transmission signal based on the signal shaping coefficients; and
   generating, by the DSIC processing unit, a control signal for cancellation of the self-interference signal in the reception signal based on the channel estimation coefficients, wherein the control signal is generated based on a first signal received from the transmitting end and a second signal obtained by downsampling an output signal of an analog-to-digital converter (ADC) disposed in the receiving end in a downsampling time domain.

2. The operation method according to claim 1, further comprising:
outputting, by the DSIC processing unit, the control signal to the digital SI cancellation unit; and
generating, by the digital SI cancellation unit, a desired signal by cancelling the self-interference signal from the reception signal based on the control signal.

3. The operation method according to claim 2, further comprising outputting, by the digital SI cancellation unit, the desired signal to a signal recovery unit disposed in the receiving end.

4. The operation method according to claim 1, further comprising outputting, by the DSIC processing unit, the formed transmitting signal to a digital-to-analog converter (DAC) disposed in the transmitting end.

5. An in-band full duplex (IFD) transceiving apparatus comprising:
a digital modem means; a digital self-interference cancellation (DSIC) processing means which is connected to the digital modem means;
a signal conversion means which is connected to the DSIC processing means; a radio frequency (RF) signal processing means which is connected to the signal conversion means;
a RF analog self-interference cancellation (ASIC) processing means which is connected to the RF signal processing means; an antenna means which is connected to the RF ASIC processing means; and
a memory storing at least one program instruction executed by the DSIC processing means,
wherein the at least one instruction is configured to:
generate, by the DSIC processing means, signal shaping coefficients for wave shaping of a transmission signal to be transmitted through the antenna means;
generate, by the DSIC processing means, channel estimation coefficients for cancellation of a self-interference signal in a reception signal which is received through the antenna means;
form, by the DSIC processing means, the transmission signal based on the signal shaping coefficients; and
generate, by the DSIC processing means, a control signal for cancellation of the self-interference signal in the reception signal based on the channel estimation coefficients, and
wherein the control signal is generated in an oversampling time domain.

6. The transceiving apparatus according to claim 5, wherein the at least one instruction is configured to generate, by the DSIC processing means, the control signal based on a first signal obtained by oversampling a signal input from the digital modem means and a second signal output from an analog-to-digital converter (ADC) disposed in the signal conversion means.

7. The transceiving apparatus according to claim 6, wherein the at least one instruction is configured to, when the signal shaping coefficients are generated, generate, by the DSIC processing means, a basis matrix based on a signal obtained by analog-to-digital converting the transmission signal, and generate, by the DSIC processing means, the signal shaping coefficients based on the basis matrix so that the first signal becomes identical to the transmission signal.

8. The transceiving apparatus according to claim 5, wherein the at least one instruction is configured to output, by the DSIC processing means, the formed transmission signal to a digital-to-analog converter (DAC) disposed in the signal conversion means.

* * * * *